United States Patent
Nishihara et al.

(10) Patent No.: US 9,831,535 B2
(45) Date of Patent: Nov. 28, 2017

(54) POWER SUPPLY DEVICE AND VEHICLE INCLUDING POWER SUPPLY DEVICE

(75) Inventors: Yoshitomo Nishihara, Osaka (JP); Kazumi Ohkura, Nara (JP); Tsuyoshi Watanabe, Gifu (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 731 days.

(21) Appl. No.: 14/007,223

(22) PCT Filed: Mar. 28, 2012

(86) PCT No.: PCT/JP2012/058260
§ 371 (c)(1),
(2), (4) Date: Sep. 24, 2013

(87) PCT Pub. No.: WO2012/133592
PCT Pub. Date: Oct. 4, 2012

(65) Prior Publication Data
US 2014/0017532 A1 Jan. 16, 2014

(30) Foreign Application Priority Data
Mar. 29, 2011 (JP) ................. 2011-073732

(51) Int. Cl.
*H01M 10/48* (2006.01)
*H01M 2/20* (2006.01)

(52) U.S. Cl.
CPC ........... *H01M 10/48* (2013.01); *H01M 2/206* (2013.01); *H01M 10/482* (2013.01)

(58) Field of Classification Search
CPC ..... H01M 10/48; H01M 10/482; H01M 2/206
See application file for complete search history.

(56) References Cited

U.S. PATENT DOCUMENTS

| | | |
|---|---|---|
| 5,456,994 A | 10/1995 | Mita |
| 2001/0049054 A1 | 12/2001 | Enomoto et al. |

(Continued)

FOREIGN PATENT DOCUMENTS

| | | |
|---|---|---|
| JP | 5-343105 | 12/1993 |
| JP | 2000-77056 | 3/2000 |

(Continued)

OTHER PUBLICATIONS

International Search Report dated May 29, 2012 in International Application No. PCT/JP2012/058260.

*Primary Examiner* — Nicholas P D'Aniello
*Assistant Examiner* — Ling R Zeng
(74) *Attorney, Agent, or Firm* — Wenderoth, Lind & Ponack, L.L.P.

(57) ABSTRACT

A power supply device in which bars BB extend in one direction and connect the terminals of the battery cells adjacent to each other. The lines (20) are electrically connectable to the bars BB. The tabs TB electrically connect the bars BB to the lines (20). The bar BB is formed of a clad plate formed of a first metal (3A) and a second metal (3B). The bar BB includes first and second holders (3a and 3b), and a tab holder. The first and second holders (3a and 3b) are arranged in the first and second metals, respectively, and hold the terminals at holding positions. The tab holder is arranged in the first metal (3A), and holds the tab TB at a holding position. The impedance between the first holder (3a) and the tab holder is substantially equal to the impedance between the tab holder and the second holder (3b).

15 Claims, 19 Drawing Sheets

(56) References Cited

U.S. PATENT DOCUMENTS

| | | | | |
|---|---|---|---|---|
| 2011/0064987 A1* | 3/2011 | Ogasawara | ............ | H01M 2/206 |
| | | | | 429/121 |
| 2011/0064993 A1* | 3/2011 | Ochi | .................... | H01M 2/266 |
| | | | | 429/158 |
| 2011/0248719 A1* | 10/2011 | Aoki | ................... | H01M 10/482 |
| | | | | 324/426 |
| 2011/0293995 A1 | 12/2011 | Sasaki et al. | | |
| 2012/0019061 A1 | 1/2012 | Nishihara et al. | | |
| 2012/0208410 A1 | 8/2012 | Ikeda et al. | | |

FOREIGN PATENT DOCUMENTS

| | | |
|---|---|---|
| JP | 2002-358945 | 12/2002 |
| JP | 2003-45409 | 2/2003 |
| JP | 2010-225449 | 10/2010 |
| JP | 2011-40332 | 2/2011 |
| JP | 2011-60623 | 3/2011 |
| WO | 2010/087472 | 8/2010 |
| WO | 2010/113455 | 10/2010 |

* cited by examiner

POWER SUPPLY DEVICE AND VEHICLE INCLUDING POWER SUPPLY DEVICE

BACKGROUND OF THE INVENTION

1. Field of the Invention

The present invention relates to a power supply device including a plurality of battery cells that are connected to each other through metal plates, and a vehicle including this power supply device. In particular, the present invention relates to a large-current power supply device that can be suitably used as a power source that stores electric energy for electric motors for driving electric vehicles such as hybrid car, fuel cell electric car, electric car and electric motorcycle, or for home use or industrial use, and a vehicle including this power supply device.

2. Description of the Related Art

In the case where a power supply device includes a number of battery cells that are connected to each other in series, the output voltage of the battery system can be high. On the other hand, in the case where a power supply device includes a number of battery cells that are connected to each other in parallel, the battery system can be charged/discharged at a large amount of current. In large current, high output power supply devices that can be used as power supply for an electric motor for driving a car, a plurality of battery cells are connected to each other in series so that the output voltage can be high. The power supply devices to be used for this type of application are charged/discharged at a large amount of current. Accordingly, the plurality of battery cells are connected to each other through metal plates having a small electric resistance.

See Japanese Laid-Open Patent Publication No. JP H05-343,105 A.

In the case where a power supply device includes a plurality of battery cells that are arranged side by side and connected to each other in series and in parallel, the electrode terminals of the of battery cell are connected to each other through bus bars that are formed of metal plates. For example, in the case where the battery cells are rectangular battery cells including rectangular exterior containers, when a battery assembly is constructed of the battery cells, which are arranged side by side, the electrode terminals of the battery cells adjacent to each other are connected to each other through elongated strip-shaped bus bars. In the case of a battery assembly shown in FIG. 29, battery cells 1 are connected to each other in three-cell-parallel and five-cell-serial connection through bus bars BB.

In order to detect abnormal conditions of the power supply device, not only an entire output voltage of the power supply device but also voltages of battery cells or blocks are detected. The battery cells can be assigned to the blocks. For example, in a power supply device that includes battery cells of rechargeable lithium-ion batteries that are arranged side by side, in order to detect voltages of the battery cell, each of the bus bars is connected to a voltage detection line.

However, the inventors found that, in the voltage detection through the bus bars, the resistances of the bus bars may produce measurement errors. Since conventional bus bars are formed of copper or aluminum having a small electric resistance, the electric resistances of the bus bars were considered very low as negligible. However, the inventors found according to their experiment that deferent positions of a voltage detection tab connected to the bus bar produced different voltage drops, which are produced by the bus bar and superimposed on a voltage of the cell.

Electric resistance is proportional to the length of the bus bar. In the case where the bus bar is long, the electric resistance component produced by the bus bar varies depending on the longitudinal connection position connected to the bus bar. In particular, the length of the bus bar will increase with the number of the battery cells that are connected in parallel to each other. In recent years, the power and capacity of power supply devices increase. Correspondingly, the number of battery cells included in such recent power supply devices increases. In this case, if even one battery cell is brought into an abnormal condition, this battery cell may affect other battery cells. For this reason, particularly in the case where a number of battery cells are included, it is important to monitor conditions of battery cells from the viewpoint of safety. Accordingly, in order to accurately grasp conditions of the battery cells, it is required to more precisely detect voltages of the battery cells.

In addition, there is a problem that corrosion may occur in the case where the metal bus bars are formed of a single material. For example, in a power supply device disclosed in JP H05-343,105 A, as shown in FIG. 30, the both ends of a metal plate 32 of the bus bar are fastened to the electrode terminals of battery cells 31 by nuts. That is, the electrode terminal is inserted into a through hole of the metal plate 32, and the nut is screwed onto the threaded part of the electrode terminal so that the metal plate 32 is fastened to the electrode terminal. In this power supply device, if the positive/negative electrode terminals of the battery cell 31 are formed of different metal materials, at one of the contact boundaries between the metal plate 32 and the positive/negative electrode terminals, the metal plate and the electrode terminal cannot be formed of the same material. For example, in the case where the positive/negative electrode terminals that are formed of copper and aluminum, respectively, as different metal materials, are included in a rechargeable lithium-ion battery, if the metal plate is a copper plate, different metal materials are in contact with each other in the contact surface between the metal plate and the electrode terminal of aluminum. In such a power supply device, which has a contact surface between the metal plate and the electrode terminal of different metal materials, electrolytic corrosion may occur in the contact surface between different metal materials. For this reason, there is a problem that the metal plate and the electrode terminal cannot be in stable contact with each other for a long time. When electric current flows between the different metal materials, this electric current will electrically decompose the materials so that the electrolytic corrosion occurs.

To address this, as shown in FIG. 31, a bus bar has been proposed which includes a clad plate of different metal materials that are joined to each other. For example, the bus bar is formed of a clad plate that is formed of copper and aluminum plate parts. The aluminum plate part is brought in contact with the positive electrode, while the copper plate part is brought in contact with the negative electrode for electric conduction (see Japanese Laid-Open Patent Publication No. JP 2011-060,623 A).

However, there is a problem that, in the case where voltages are detected through this type of bus bar, which includes a clad plate of different metal materials that are joined to each other, in particular, when the bus bar is long, the electric resistance component produced by the bus bar in a detected electric resistance varies in accordance with the position of a voltage detection terminal (voltage detection tab) in the bus bar. A clad plate has different electrical conductivities, i.e., electric resistances corresponding to the different materials of the clad plate. The error will be much more complicated. For example, the electrical conductivity of aluminum is approximately 60% of copper. For this reason, even if the aluminum and copper parts have the same shape, the plates parts have different electric resistances. Also, in the case where a copper voltage detection tab is used, when the voltage detection tab is joined by laser welding to the bus bar of clad plate that is formed of aluminum and copper, it will be necessary to connect the voltage detection tab not to the aluminum side but to the copper side in consideration of material characteristics. Accordingly, the connection position of the voltage detection tab will be located not at the center but at a deviated position deviated toward the copper side on a side surface of the clad plate. As a result, there is a problem that the impedances between the electrode terminals and the voltage detection tab will be different from each other.

The present invention is aimed at solving the problems. It is a main object of the present invention is to provide a power supply device that can suppress errors in battery cell voltage detection and precisely detect battery cell voltages, and a vehicle including this power supply device.

SUMMARY OF THE INVENTION

To achieve the above object, a power supply device according to a first aspect of the present invention includes a battery assembly, bus bars, voltage detection lines, and a plurality of voltage detection tabs. The battery assembly includes a plurality of battery cells including electrode terminals. The plurality of battery cells are arranged side by side. The bus bars extend in one direction, and connect the electrode terminals of the battery cells adjacent to each other. The voltage detection lines are electrically connectable to the bus bars. The plurality of voltage detection tabs electrically connect the bus bars to the voltage detection lines. The bus bar is formed of a clad plate that is formed of a first metal portion and a second metal portion the material of which is different from the first metal portion. The bus bar includes first and second holding portions, and a tab holding portion. The first terminal holding portion is arranged in the first metal portion, and has a holding position for holding the electrode terminal. The second terminal holding portion is arranged in the second metal portion, and has a holding position for holding the electrode terminal. The tab holding portion is arranged in the first metal portion, and has a holding position for holding the voltage detection tab. The impedance between the first terminal holding portion and the tab holding portion is substantially equal to the impedance between the tab holding portion and the second terminal holding portion. According to this construction, although a clad plate formed of the different metal materials is used as bus bars, it is possible to suppress errors in battery cell voltage detection through the voltage detection tabs and to precisely detect battery cell voltages.

In a power supply device according to a second aspect of the present invention, the electrical conductivity of the first metal portion can be higher than the second metal portion.

In a power supply device according to a third aspect of the present invention, the distance between the first terminal holding portion and the tab holding portion can be dimensioned greater than the distance between the tab holding portion and the second terminal holding portion. According to this construction, the impedance between the first terminal holding portion and the tab holding portion can be close to the impedance between the tab holding portion and the second terminal holding portion. Therefore, it is possible to compensate for the electric resistance difference caused by the electrical conductivity difference.

In a power supply device according to a fourth aspect of the present invention, the first metal portion can be thinner than the second metal portion. According to this construction, the impedance between the first terminal holding portion and the tab holding portion can be close to the impedance between the tab holding portion and the second terminal holding portion. Therefore, it is possible to compensate for the electric resistance difference caused by the electrical conductivity difference.

In a power supply device according to a fifth aspect of the present invention, the first metal portion can have a narrower part that has a width smaller than other part of the first metal portion, and can be arranged between the first terminal holding portion and the tab holding portion. According to this construction, the impedance between the first terminal holding portion and the tab holding portion can be close to the impedance between the tab holding portion and the second terminal holding portion. Therefore, it is possible to compensate for the electric resistance difference caused by the electrical conductivity difference.

In a power supply device according to a sixth aspect of the present invention, the second metal portion can be dimensioned wider than the first metal portion. According to this construction, the impedance between the first terminal holding portion and the tab holding portion can be close to the impedance between the tab holding portion and the second terminal holding portion. Therefore, it is possible to compensate for the electric resistance difference caused by the electrical conductivity difference.

In a power supply device according to a seventh aspect of the present invention, two or more first terminal holding portions can be provided as the first terminal holding portion of the first metal portion, and two or more second terminal holding portions can be provided as the second terminal holding portion of the second metal portion. In addition, the impedance between the first terminal holding portions in the first metal portion can be substantially equal to the impedance between the second terminal holding portions in the second metal portion. According to this construction, also in the case where the bus bar connects two or more battery cells in parallel to each other, it is possible to suppress the electric resistance difference between parts of the bus bar and to precisely detect battery cell voltages.

In a power supply device according to an eighth aspect of the present invention, the impedance between the tab holding portion and one of the two or more first terminal holding portions that is located closest to the second metal portion can be substantially equal to the impedance between the tab holding portion and one of the two or more second terminal holding portions that is located closest to the first metal portion. According to this construction, although a clad plate of the different metal materials is used as bus bars, it is possible to suppress the variation in battery cell voltage detection through each voltage detection tab and to precisely detect battery cell voltages.

In a power supply device according to a ninth aspect of the present invention, the first metal portion of the bus bar can be formed of the same material as the voltage detection tab. According to this construction, the bus bar and the voltage detection tab can be easily joined by laser welding, or the like, to each other.

In a power supply device according to a tenth aspect of the present invention, the first and second metal portions of the bus bar can be formed of copper and aluminum, respectively, and the voltage detection tab can be formed of copper.

A power supply device according to an eleventh aspect of the present invention includes a battery assembly, bus bars, voltage detection lines, and a plurality of voltage detection tabs. The battery assembly includes a plurality of battery cells including electrode terminals. The plurality of battery cells are arranged side by side. The bus bars extend in one direction, and connect the electrode terminals of the battery cells adjacent to each other. The voltage detection lines are electrically connectable to the bus bars. The plurality of voltage detection tabs electrically connect the bus bars to the voltage detection lines. The bus bar is formed of a clad plate that is formed of a first metal portion and a second metal portion the material of which is different from the first metal portion. The bus bar includes first and second holding portions, and a tab holding portion. The first terminal holding portion has a holding position for holding the electrode terminal of one of the battery cells adjacent to each other. The second terminal holding portion has a holding position for holding the electrode terminal of another of the battery cells adjacent to each other. The tab holding portion is arranged between the first and second holding positions, and has a holding position for holding the voltage detection tab. The impedance between the first terminal holding portion and the tab holding portion is substantially equal to the impedance between the tab holding portion and the second terminal holding portion. According to this construction, it is possible to suppress the variation in battery cell voltage detection through each voltage detection tab and to precisely detect battery cell voltages.

In a power supply device according to a twelfth aspect of the present invention, the voltage detection tab can be joined to the bus bar by laser welding.

In a power supply device according to a thirteenth aspect of the present invention, the voltage detection tab can be joined to a flexible base by reflowing.

In a power supply device according to a fourteenth aspect of the present invention, the voltage detection lines can be arranged on flexible bases each of which holds a plurality of detection lines that are electrically connected to the bus bars, and extends in one direction. According to this construction, since the flexible base holds a plurality of detection lines, it is possible to easily handle the detection lines.

In a power supply device according to a fifteenth aspect of the present invention, the bus bar can extend substantially in parallel to the side-by-side arrangement direction of the battery cells, and the flexible base can extend substantially in parallel to the bus bar. In addition, the voltage detection tab can straddle the space between the bus bar and the flexible base. According to this construction, the voltage detection tab can be short which connects the flexible base to the bus bar. Therefore, it is advantageous that the power supply device can be simply constructed.

In a power supply device according to a sixteenth aspect of the present invention, the battery cell is a rectangular battery cell that has a rectangular exterior shape. According to this construction, in the case where the battery assembly includes rectangular battery cells that are arranged side by side, the volumetric capacity can be high, while the bus bars can be efficiently arranged.

A vehicle according to a seventeenth aspect of the present invention includes the aforementioned power supply device.

The above and further objects of the present invention as well as the features thereof will become more apparent from the following detailed description to be made in conjunction with the accompanying drawings.

DETAILED DESCRIPTION OF THE EMBODIMENT(S)

The following description will describe embodiments according to the present invention with reference to the drawings. It should be appreciated, however, that the embodiments described below are illustrations of a power supply device and a vehicle including this power supply device to give a concrete form to technical ideas of the invention, and a power supply device and a vehicle including this power supply device of the invention are not specifically limited to description below. Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown larger exaggeratingly for ease of explanation. Members same as or similar to those of this invention are attached with the same designation and the same reference signs, and their description is omitted. In addition, a plurality of structural elements of the present invention may be configured as a single part that serves the purpose of a plurality of elements, on the other hand, a single structural element may be configured as a plurality of parts that serve the purpose of a single element. Also, the description of some of examples or embodiments may be applied to other examples, embodiments or the like.

Figure 1:
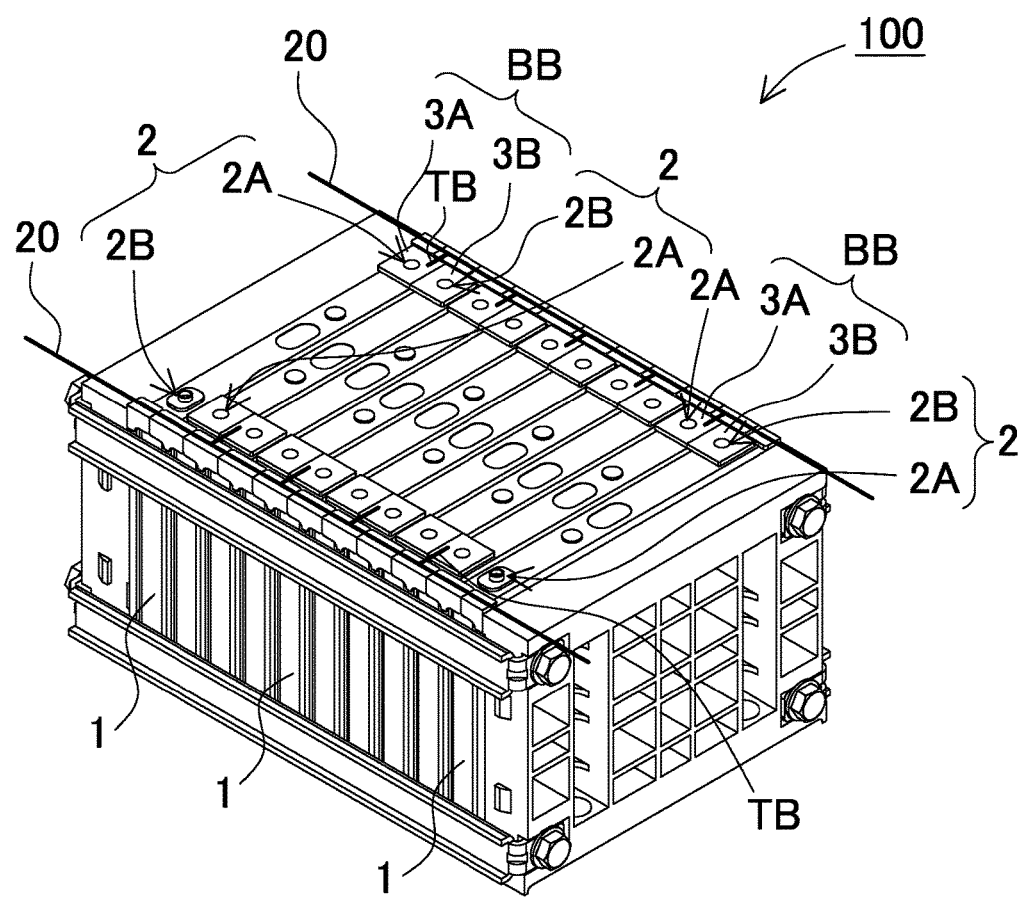
FIG. 1 is a perspective view of a power supply device according to an embodiment of the present invention.
Figure 2:
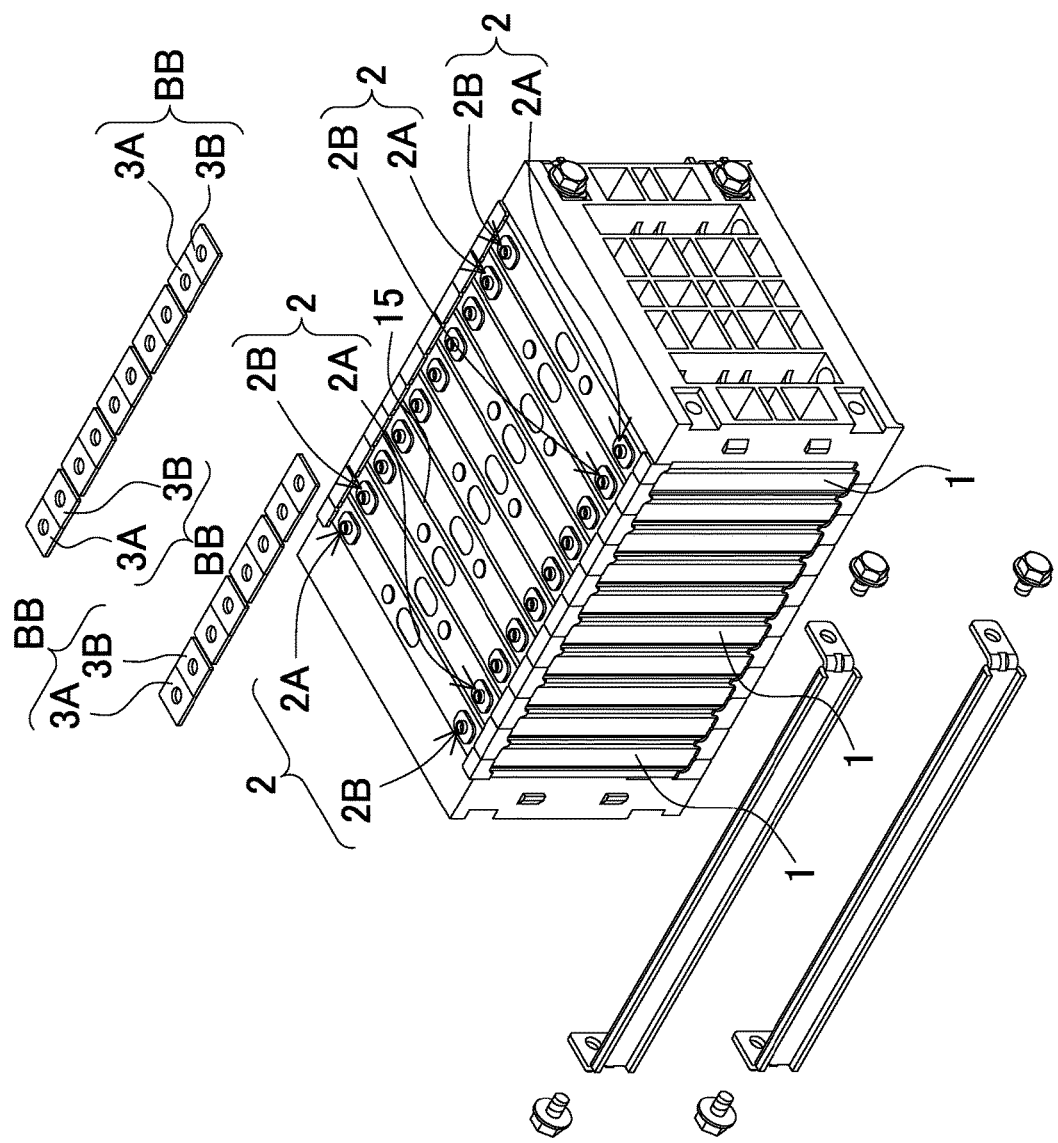
FIG. 2 is an exploded perspective view of the power supply device shown in FIG. 1.

FIGS. 1 and 2 are perspective views showing a power supply device 100 according to a first embodiment that can be mainly installed on an electric vehicle such as hybrid car and electric car, and is used as a power supply for supplying electric power to an electric motor of the electric vehicle whereby driving the electric vehicle. This illustrated power supply device 100 includes a battery assembly, bus bars BB, voltage detection lines 20, and a plurality of voltage detection tabs TB. The battery assembly includes a plurality of battery cells 1 including electrode terminals 2. The plurality of battery cells are arranged side by side. The bus bars BB extend in one direction and connect the electrode terminals 2 of the battery cells 1 adjacent to each other. The voltage detection lines are electrically connectable to the bus bars BB. The plurality of voltage detection tabs TB electrically connect the bus bars BB to the voltage detection lines 20.

Figure 3:
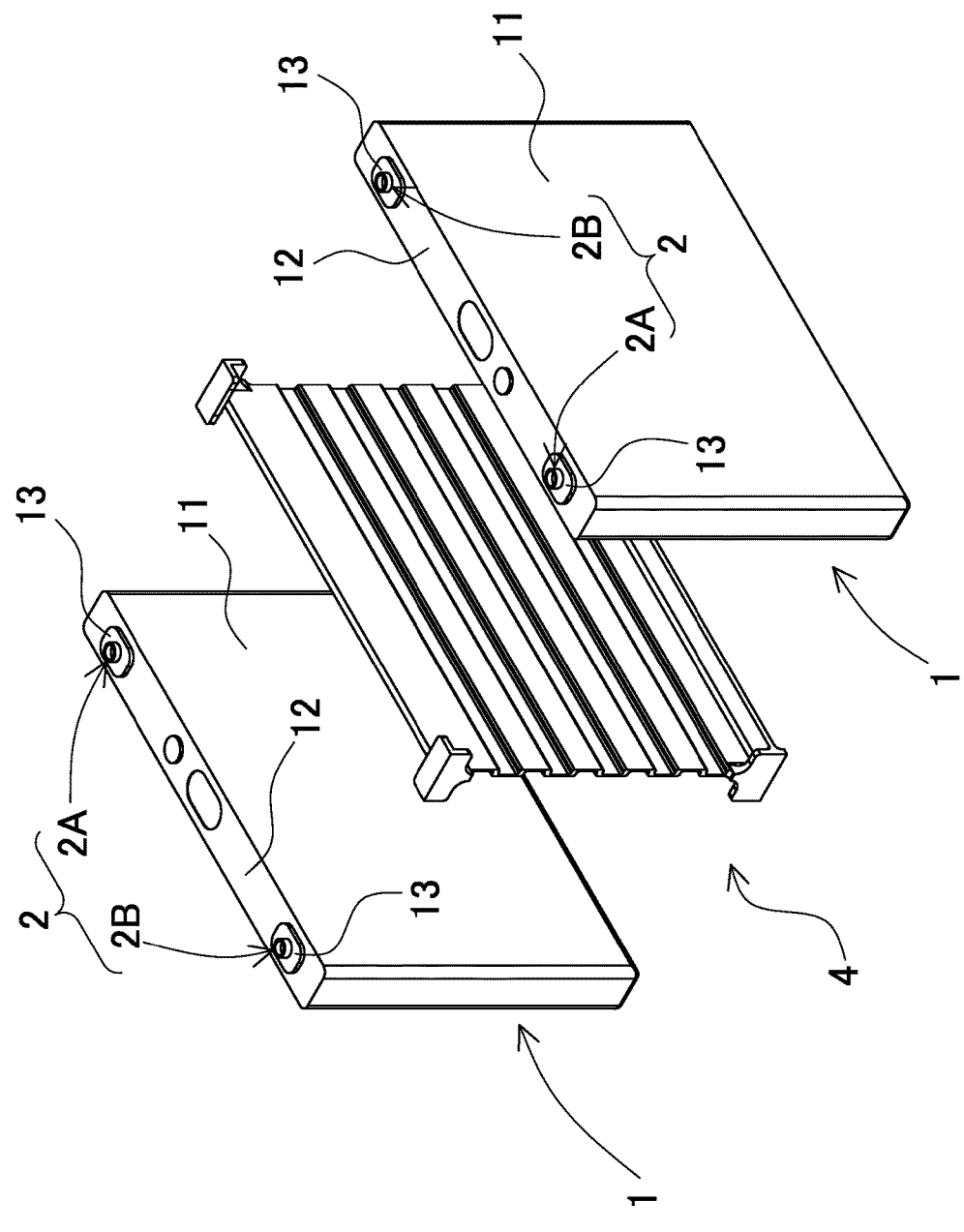
FIG. 3 is an exploded perspective view showing the side-by-side arrangement of battery cells and an electrically insulating spacer of the power supply device shown in FIG. 1.

The plurality of battery cells 1 of the battery assembly are held with the battery cells being arranged side by side and electrically insulated from each other. The battery cell 1 is a rectangular battery cell. More specifically, the battery cell 1 is a rectangular battery cell of lithium-ion battery. It will be appreciated that the battery cells in the power supply device according to the present invention are not limited to rectangular battery cells, and can be cylindrical battery cells. The battery cells in the power supply device according to the present invention are not limited to rechargeable lithium-ion batteries, and can be nickel metal hydride batteries, or the like, for example. As shown in FIG. 3, the rectangular battery cell 1 includes electrode members of positive/negative electrode plates that overlap each other. After the electrode members are accommodated in an exterior container 11, exterior container is filled with an electrolytic solution, and the opening of the exterior container is airtightly sealed by a sealing plate 12. The illustrated exterior container 11 has a rectangular box shape that has a top opening and a closed bottom. The top opening of the exterior container is airtightly closed by the sealing plate 12. Electrically insulating spacers 4 can be interposed between the battery cells 1 so that the battery cells can be electrically insulated from each other if desired or necessary.

The exterior container 11 is formed by subjecting a metal plate (e.g., aluminum plate) to deep drawing. The surface of the exterior container has electrical conductivity. The battery cells 1 to be arranged side by side are formed in a low-profile rectangular box shape. The sealing plate 12 is formed of a metal plate the material of which is same as the exterior container 11 (e.g., aluminum plate). Positive/negative terminals 2 are secured to the both side parts of the sealing plate 12. Electrically insulating members 13 are interposed between the terminals and the sealing plate. The positive/negative terminals 2 are connected to the positive/negative electrode plates, which are accommodated in the exterior container. The exterior container 11 of the rechargeable lithium-ion battery is not connected to the electrodes. On the other hand, the exterior container 11 is connected to the electrode plates through the electrolytic solution. Accordingly, the potential of the exterior container will be an intermediate potential between the positive/negative electrode plates. It will be appreciated that one of the terminals of the battery cell may be connected to the exterior container through a lead. In this case, the terminal that is connected to the exterior container can be fastened to the sealing plate without the electrically-insulating member.

The plurality of battery cells 1 are arranged side by side so that the battery assembly of the power supply device 100 has a rectangular block shape. When the battery cells 1 are arranged side by side, the surfaces (the sealing plates 12) of the battery cells with the electrode terminals 2 are arranged coplanar with each other. As a result, the power supply device can have a rectangular block shape. In the power supply device 100 shown in FIGS. 1 and 2, the electrode terminals 2 are located on the upper surface of the block. When the battery cells of the power supply device 100 are arranged side by side, the positive/negative electrode terminals 2 on the both end parts of the sealing plates 12 are flipped from side to side. In the illustrated power supply device 100, the electrode terminals 2 that are arranged adjacent to each other on each side of the block are connected to each other through the bus bar BB so that the battery cells 1 are connected to each other in series. The both ends of the bus bar 3 are connected to the positive/negative electrode terminals 2 so that the battery cells 1 are connected to each other in series. In the illustrated power supply device 100, the battery cells 1 are connected to each other in series so that the output voltage of the power supply device can be high. However, it will be appreciated that the battery cells of the power supply device according to the present invention can be connected to each other in series and in parallel so that both the output voltage and the output current of the power supply device can be high.

The electrode terminal 2 is held by the sealing plate 12 with the electrically insulating material 13 being interposed between the electrode terminal and the sealing plate. One end of the electrode terminal is formed in a cylindrical shape. The cylindrical electrode terminal 2 can be subjected to caulking so that a caulked ring can be formed in the end part of the electrode terminal. However, in the power supply device according to the present invention, the cylindrical electrode terminal does not necessarily have the caulked ring. The reason is that the bus bar may be secured by welding to the upper end surface of the electrode terminal. This electrode terminal can have a cylindrical or polygonal prism shape, or a cylindrical or polygonal prism shape that has a flange on the upper end surface of the cylindrical or polygonal prism shape. The bus bar can be joined by welding to the upper end surface of the electrode terminal.

The positive/negative electrode terminals 2 of the battery cell 1 are formed not of a single metal material but of different metal materials. The lithium ion battery includes the positive electrode 2A of aluminum, and the negative electrode 2B of copper. The both ends of the bus bar BB are formed of different metals. Each of the ends of the bus bar BB is connected to the corresponding electrode terminal 2 that is formed of the same metal as the end of the bus bar. In the case where the bus bar BB is connected to the battery cell 1 that includes the electrodes 2 of aluminum and copper, the bus bar BB includes a copper plate part as first metal portion 3A, and an aluminum plate part as second metal portion 3B. The second metal portion 3B and the first metal portion 3A are securely joined to each other.

(Bus Bar BB)

Besides homogeneous metal plate, the bus bar BB can be a clad plate that is formed of the first metal portion 3A, and the second metal portion 3B the material of which is different from the first metal portion 3A. The voltage detection tab TB is secured to the bus bar BB so that a cell voltage can be detected. It is preferable that the first metal portion 3A of the bus bar BB be formed of the same material as the voltage detection tab TB. In the case where the bus bar BB is formed of the same material as the voltage detection tab TB, the bus bar and the voltage detection tab can be easily joined by laser welding, or the like, to each other.

Figure 4:
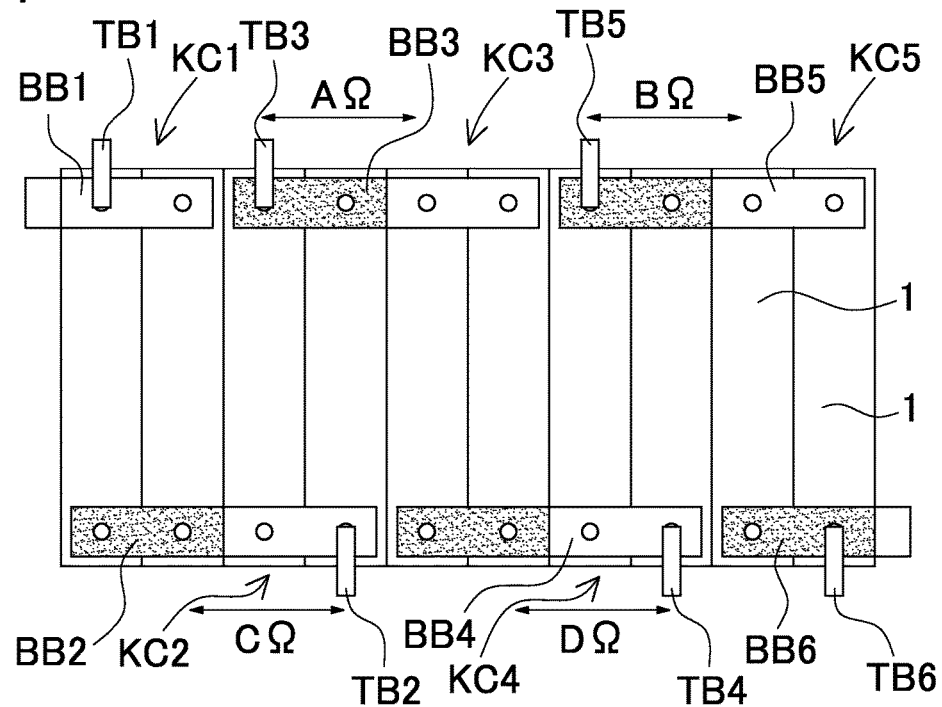
FIG. 4 is a plan view schematically showing the battery assembly, which includes ten battery cells that are connected by bus bars to each other in two-cell-parallel and five-cell-serial connection.

In the voltage detection through the bus bars BB, the resistances (i.e., impedances) of the bus bars BB may produce errors in measurement. For example, a battery assembly is now discussed which includes ten battery cells that are connected by bus bars BB to each other in two-cell-parallel and five-cell-serial connection as shown in FIG. 4. In this battery assembly, battery cells are assigned to sets of battery pack cells KC 1 to 5 each of which consists of two battery cells. The voltage detection tabs TB 1 to 6 are connected to the bus bars BB so that cell voltages of sets of battery pack cells can be detected based on the differences between tab detection voltages. In this case, it is found that deferent positions of the voltage detection tab TB connected to the bus bar BB produces different voltage drops, which are produced by the bus bar and superimposed on a voltage of the cell. In particular, when the bus bar BB and the voltage detection tab TB are joined by laser welding to each other, it is preferable that the copper parts be joined to each other by welding in order to prevent production of an alloy from the different metal materials and to provide a stable strength since the bus bar BB is formed of copper as stated above. For this reason, the holding position between the bus bar BB and the voltage detection tab TB will not be located at the cnter of the bus bar BB, but be typically deviated from the center toward the first metal portion 3A side.

In FIG. 4, the deviation of the holding position of each of the voltage detection tabs TB 1 to 6 is shown larger exaggeratingly for ease of understanding the deviated holding position, which is deviated from the center of the bus bar. In the bus bar BB2 to which the voltage detection tab TB2 is connected, the electric resistance between the holding position of the voltage detection tab TB1 and the holding position of the electrode terminal 2 of the battery pack cell KC1 is represented by C [Ω]. Since the voltage detection tab TB2 is joined to the bus bar BB2 at the position of the electrode terminal 2 of the battery pack cell KC2, the electric resistance of the bus bar BB2 between the holding position of the electrode terminal 2 of the battery pack cell KC2 and the holding position of the voltage detection tab TB is substantially zero. Similarly, in the bus bar BB3 to which the voltage detection tab TB3 is connected, the electric resistance between the voltage detection tab TB and the battery pack cell KC2 is considered as zero, and the electric resistance between the voltage detection tab TB and the battery pack cell KC3 is expressed by A. Also, in the bus bar BB4 to which the voltage detection tab TB4 is connected, the electric resistance between the voltage detection tab TB and the battery pack cell KC3 is expressed by D, and the electric resistance between the voltage detection tab TB and the battery pack cell KC4 is considered as zero. In addition, in the bus bar BB5 to which the voltage detection tab TB5 is connected, the electric resistance between the voltage detection tab TB and the battery pack cell KC4 is considered as zero, and the electric resistance between the voltage detection tab TB and the battery pack cell KC5 is expressed by B.

In this battery assembly, although a cell voltage of the battery pack cell KC1 can be essentially obtained by a tab detection voltage between the voltage detection tabs TB1 and TB2, the actually detected value of this tab detection voltage will be a value that is obtained by adding a voltage of C [Ω]×electrical current to a cell voltage of the battery pack cell KC1. Also, a cell voltage of battery pack cell KC2 is substantially equal to a tab detection voltage between the voltage detection tabs TB2 and TB3. Also, a cell voltage of the battery pack cell KC3 will be a value that is obtained by adding a voltage of A+D [Ω]×electrical current to a tab detection voltage between voltage detection tabs TB3 and TB4. Also, a cell voltage of the battery pack cell KC4 is substantially equal to a tab detection voltage between the voltage detection tabs TB4 and TB5, and a cell voltage of the battery pack cell KC5 will be a value that is obtained by adding a voltage of B [Ω]×electrical current to a tab detection voltage between voltage detection tabs TB5 and TB6. Thus, cell voltages of the battery pack cells KC are not equal to tab detection voltages that are simply measured at the voltage detection tabs TB but include errors. Accordingly, precise voltages cannot be obtained without complicated calculation.

Figure 5:
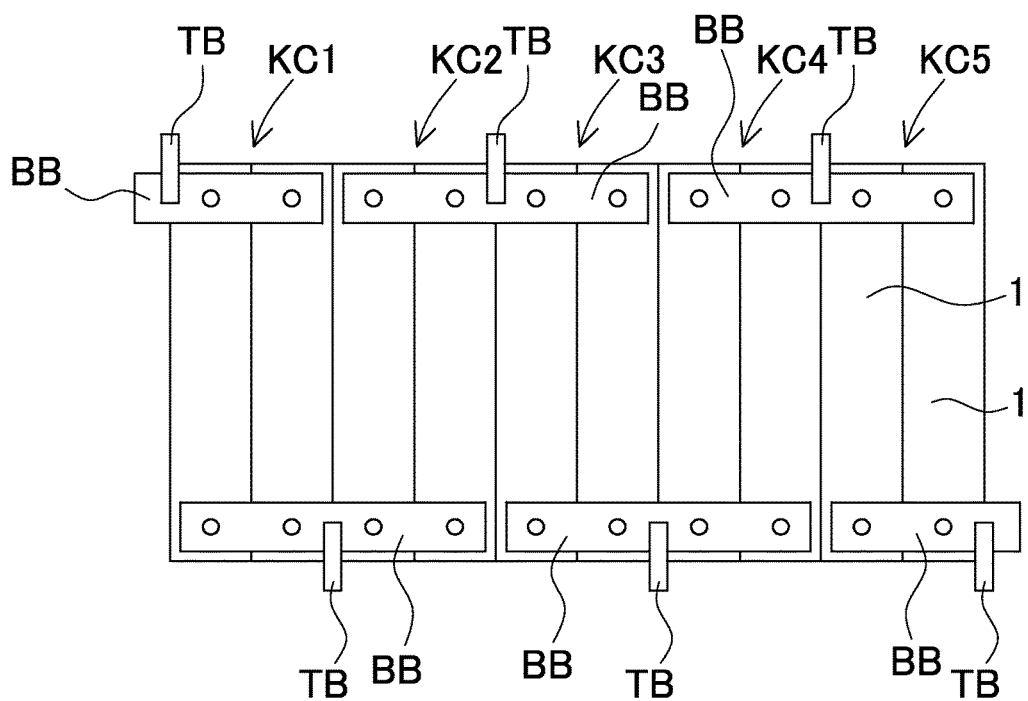
FIG. 5 is a plan view schematically showing exemplary holding positions of voltage detection tabs each of which is located at the center of the bus bar.

As discussed above, there is a problem that voltage detection errors occur depending on the holding positions of the voltage detection tabs TB on the bus bars. This problem arises not only in a battery assembly that includes a bus bar of clad plate but in a battery assembly that includes a bus bar formed of a single metal material. In the case where the bus bar is formed of a single material, as shown in FIG. 5, the holding position of the voltage detection tab TB can be positioned at the center of the bus bar, in other words, the distances of the electrode terminals 2 from the voltage detection tab TB are dimensioned equal to each other. Thus, errors can be equalized, in other words, voltage components that are produced by the resistance components of the bus bar is equalized. As a result, an actual cell voltage can be simply calculated. However, in the case where the bus bar is formed of a clad plate, even if the distances of the electrode terminals 2 from the voltage detection tab TB are dimensioned equal to each other, an accurate cell voltage cannot be simply calculated. In this case, since the clad plate consists of different materials, their electric resistances are different from each other. Accordingly, such simple adjustment of the holding position of the voltage detection tab cannot solve the problem.

Then, in this embodiment, in order to simply adjust errors, the bus bar is designed so as to match the impedances with each other.

(Calculation of Cell Voltages in Homogeneous Bus Bar)

Calculation of cell voltage for adjusting the impedances of parts of the bus bar is now described with reference to FIG. 6. Here, a battery assembly includes ten battery cells that are connected by the bus bars BB to each other in two-cell-parallel and five-cell-serial connection similar to the battery assembly shown in FIG. 4. The voltage detection tabs TB are positioned between the battery pack cells KC6 to KC10 similar to the battery assembly shown in FIG. 5. The bus bar BB is formed of a homogeneous material. It is considered that the bus bar BB has a common impedance value. The temperature variation and aging of impedance are not taken into consideration. Also, it is assumed that the electrode terminals 2 of the battery cell are positioned at the center of the battery cell in the thickness direction.

Figure 6:
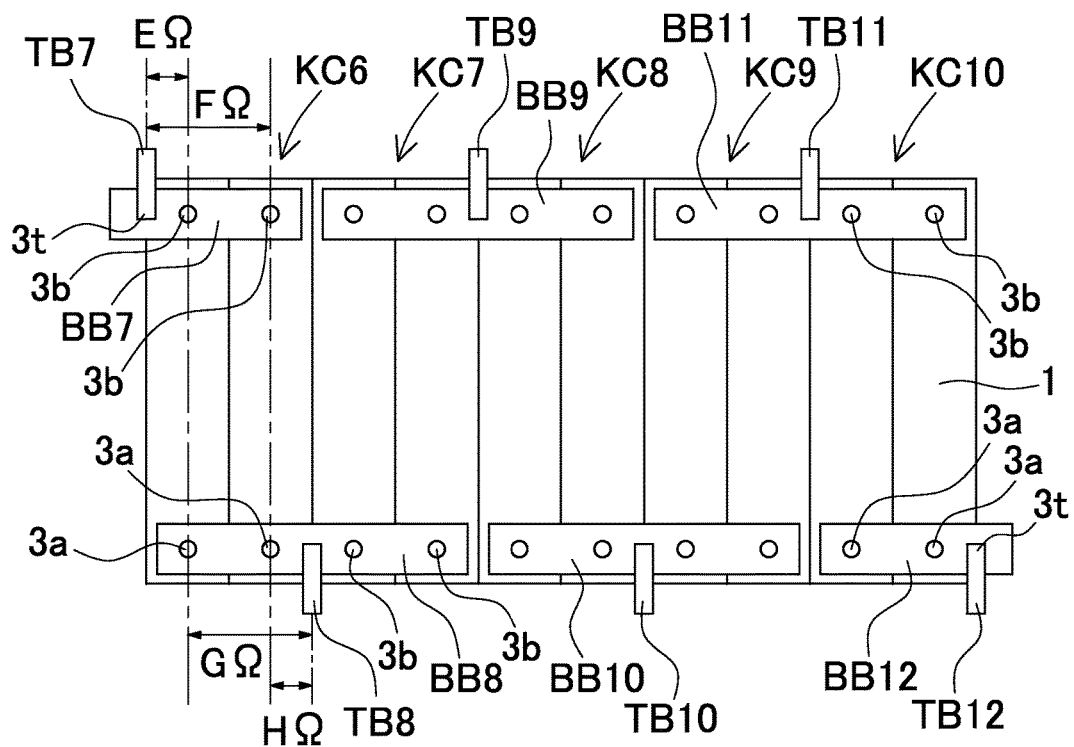
FIG. 6 is a plan view schematically showing a calculation method for cell voltages.

In FIG. 6, two battery cells in the battery pack cell KC6 are defined as battery cells a and b. The battery cells a and b are connected in parallel to each other in the battery pack cell KC6. In the bus bar BB7 to which the voltage detection tab TB7 is connected, the electric resistance between the holding position of the voltage detection tab TB6 and the holding position of the electrode terminal 2 of the battery cell a is represented by E [Ω]. Also, the electric resistance between the holding position of the voltage detection tab TB7 and the holding position of the electrode terminal 2 of the battery cell b is represented by F [Ω]. In addition, in the bus bar BB8 to which the voltage detection tab TB8 is connected, the electric resistance between the holding position of the voltage detection tab TB8 and the holding position of the electrode terminal 2 of the battery cell a is represented by G [Ω]. Also, the electric resistance between the holding position of the voltage detection tab TB8 and the holding position of the electrode terminal 2 of the battery cell b is represented by H [Ω]. A voltage of the battery cell a can be obtained as follows.

Voltage of battery cell $a$=(Voltage of Battery Pack Cell $KC6$)−{($E+G$)×Electric Current}

Similarly, a voltage of the battery cell b can be obtained as follows.

Voltage of battery cell $b$=(Voltage of Battery Pack Cell $KC6$)−{($F+H$)×Electric Current}

The impedances of the bus bars BB have a relationship of $E+G$ [Ω]≈$F+H$ [Ω]. Since it can be considered that the bus bar BB has a common impedance value, cell voltages of battery cells a and b can be calculated.

(Clad Plate)

Figure 7:
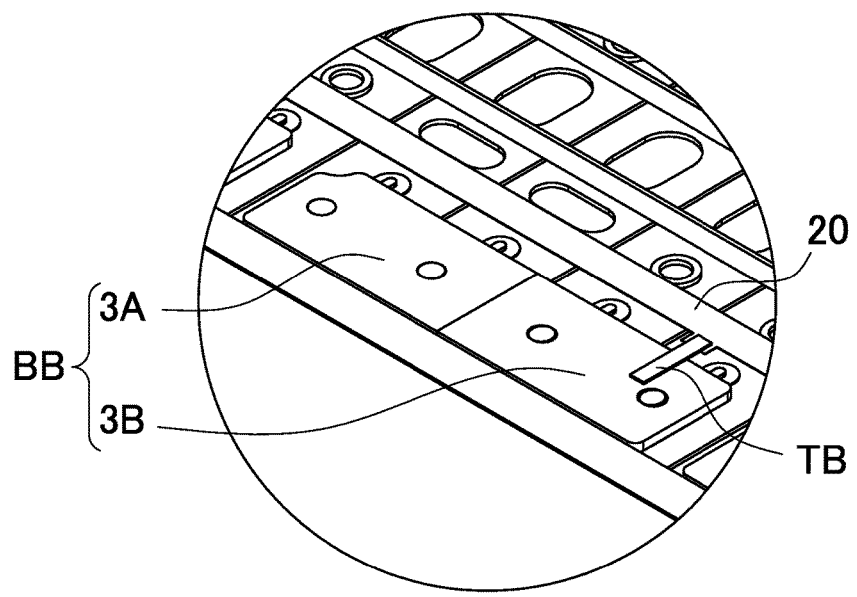
FIG. 7 is an enlarged perspective view showing a holding position of the voltage detection tab in the bus bar of the clad plate.

As discussed above, the bus bar is formed not only of a single material but of different metal materials. FIG. 7 is an enlarged perspective view showing the voltage detection tab TB and the bus bar that is formed of a clad plate with the voltage detection tab TB being joined to the bus bar.

(Voltage Detection Line 20)

The voltage detection lines 20 according to this embodiment are constructed as flexible bases. Each of the flexible bases includes a plurality of voltage detection lines that can be electrically connected to the bus bars BB. The flexible bases are thin and occupy little space. For this reason, the flexible bases are suitable for power supply device for vehicles, or the like, where space is limited. In addition, it is advantageous that the flexible base can be secured by reflow-soldering in terms of installation. The flexible base is formed in a strip shape that extends in one direction. A plurality of solder strips are arranged at intervals on the flexible base for electrical connection between the flexible base and the voltage detection tab TB.

The flexible bases extend substantially in parallel to the side-by-side arrangement direction of the battery cells. The bus bars BB extend substantially in parallel to the side-by-side arrangement direction of the battery cells. Thus, the voltage detection tab TB can straddle the space between the bus bar BB and the solder strip on the flexible base. According to this construction, it is advantageous that the voltage detection tab TB can be short which connects the flexible base to the bus bar BB. In order that the solder strip can be joined to the tab by reflowing, the solder strip on the flexible base is previously designed so that the solder strip protrudes toward the position that will be positioned close to the tab. Thus, the voltage detection tab TB is joined to the flexible base by reflow-soldering. Also, the voltage detection tab TB is joined to the bus bar BB by laser welding. The voltage detection tab TB is formed of copper with the surface of the copper being plated with tin.

(Calculation of Cell Voltages in Bus Bar of Clad Plate)

Figure 8:
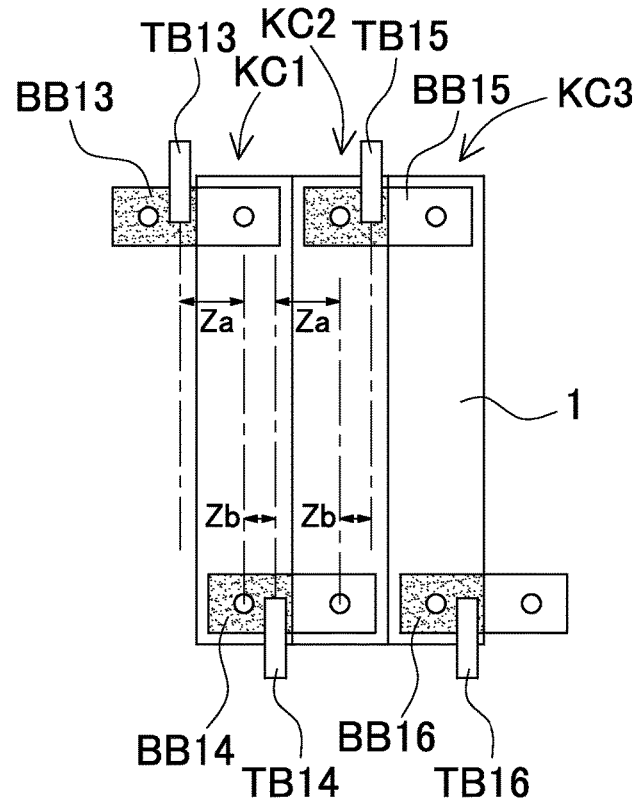
FIG. 8 is a plan view schematically showing a calculation method for cell voltages in a bus bar of clad plate.

Calculation of cell voltage is now described in the bus bar formed of clad plate with reference to FIG. 8. Three battery cells in the battery assembly that are connected in series to each other are shown in FIG. 8. The bus bar BB of clad plate consists of the first and second metal portions 3A and 3B. The second metal portion 3B is formed of a metal material having a thermal conductivity smaller the first metal portion 3A. The first metal portion 3A is formed of copper, while the second metal portion 3B is formed of aluminum. The voltage detection tabs TB are secured to the bus bars BB so that cell voltages can be detected. The voltage detection tab TB is formed of copper with the surface of the copper being plated with tin. As a result, the voltage detection tab TB can be securely joined by laser welding to the bus bar BB that is formed of the same material as the voltage detection tab TB. Also, the voltage detection tab TB and the voltage detection line 20 can be joined to each other by reflow-soldering.

Figure 9:
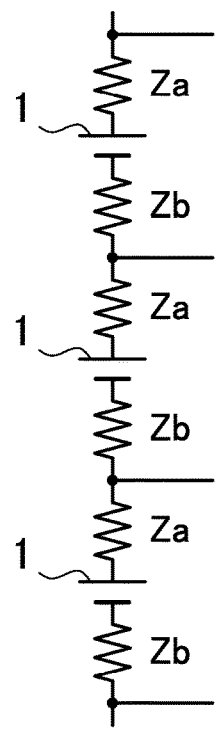
FIG. 9 is a circuit diagram showing the equivalent circuit to FIG. 8.
Figure 10:
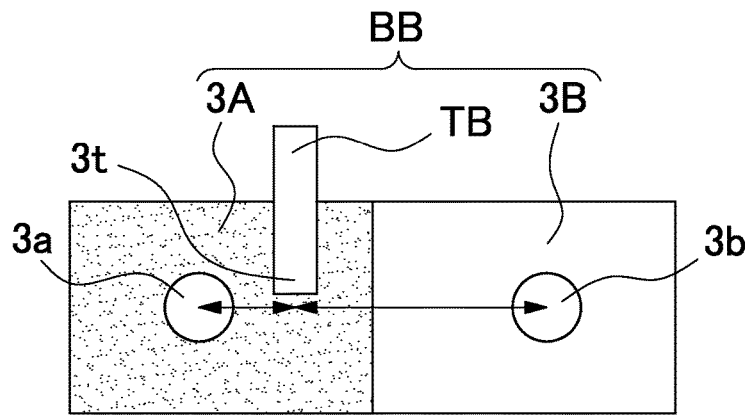
FIG. 10 is a plan view schematically showing a bus bar.

Each of the bus bars BB includes one or more terminal holding portions that have holding positions for holding the electrode terminals 2, and a tab holding portion 3*t* that has a holding position for holding the voltage detection tab TB. The first terminal holding portion 3*a* and the tab holding portion 3*t* are arranged in the first metal portion 3A. The second terminal holding portion 3*b* is arranged in the second metal portion 3B. In FIG. 8, the impedance between the first terminal holding portion 3*a* and the tab holding portion 3*t* in each of the bus bar BB13 to BB16 is defined as $Z_b$, and the impedance between the tab holding portion 3*t* and the second terminal holding portion 3*b* is defined as $Z_a$. The equivalent circuit in FIG. 8 can be expressed as shown in FIG. 9. When the impedance between the first terminal holding portion 3*a* and the tab holding portion 3*t* can be adjusted to the impedance between the tab holding portion 3*t* and the second terminal holding portion 3*b*, in other words, when the impedances can be adjusted to $Z_a=Z_b$ in the bus bar BB shown in FIG. 10, correction of cell voltage can be simple.

Figure 11:
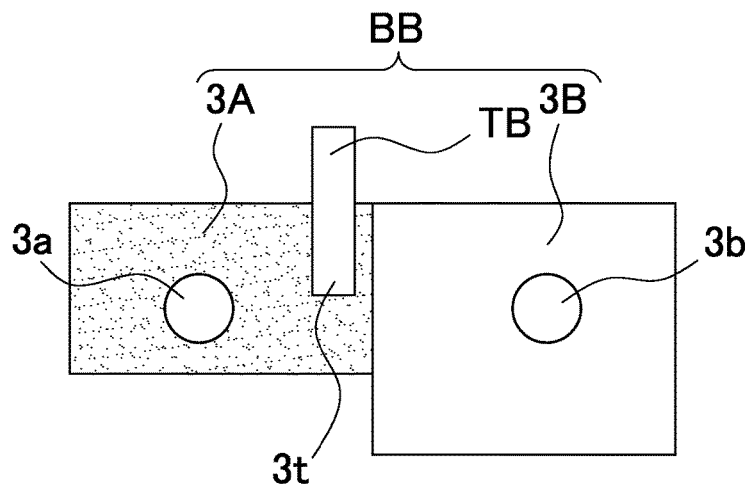
FIG. 11 is a plan view schematically showing a bus bar according to an embodiment.
Figure 12:
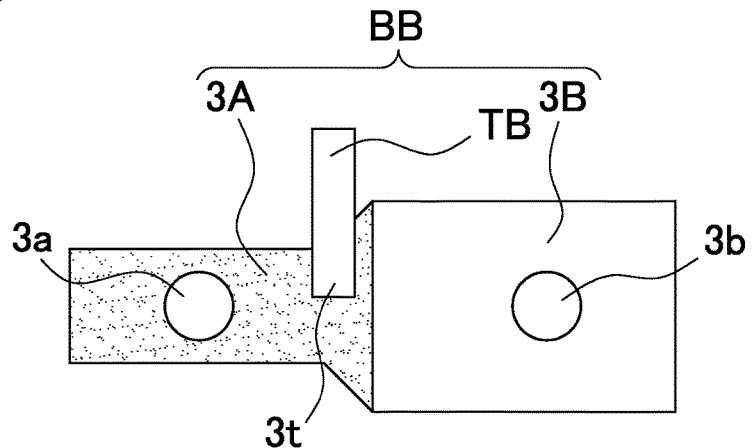
FIG. 12 is a plan view schematically showing a bus bar according to a modified embodiment.

Specifically, the widths of the first and second metal portions 3A and 3B in the plan view are adjusted so that the impedances match with each other. For example, as shown in FIG. 11, the width of the first metal portion 3A is adjusted smaller so as to increase the impedance of the first metal portion and to match the impedance of the first metal portion with the second metal portion 3B. Alternatively, the width of the second metal portion 3B is adjusted greater so as to reduce the impedance of the second metal portion 3B and to match the impedance of the second metal portion with the first metal portion 3A. In this case, the boundary between the first and second metal portions 3A and 3B can be formed in a stepped shape, as shown in FIG. 11. Alternatively, as shown in FIG. 12, the width of the first metal portion can gradually decrease whereby prevent that a harness or the like is caught by the stepped boundary. The width changing part can be formed in a straight shape as shown in FIG. 12, or in a curved shape.

Figure 13:
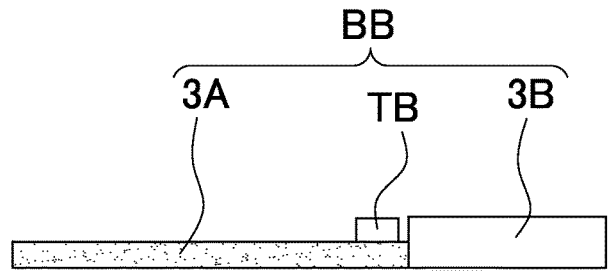
FIG. 13 is a side view schematically showing the bus bar according to the modified embodiment.

Also, as shown in FIG. 13, the thicknesses of the first and second metal portions 3A and 3B can be adjusted so that the impedances of the first and second metal portions match with each other. For example, as shown in FIG. 13, the thickness of the first metal portion 3A is adjusted smaller so as to increase the impedance of the first metal portion and to match the impedance of the first metal portion with the second metal portion 3B. Alternatively, the thickness of the second metal portion 3B can be adjusted greater so as to reduce the impedance of the second metal portion 3B and to match the impedance of the second metal portion with the first metal portion 3A. Also, similar to FIG. 12, the thickness-changing boundary between the first and second metal portions is not limited to a stepped shape, but the thickness can be gradually changed.

Figure 14:
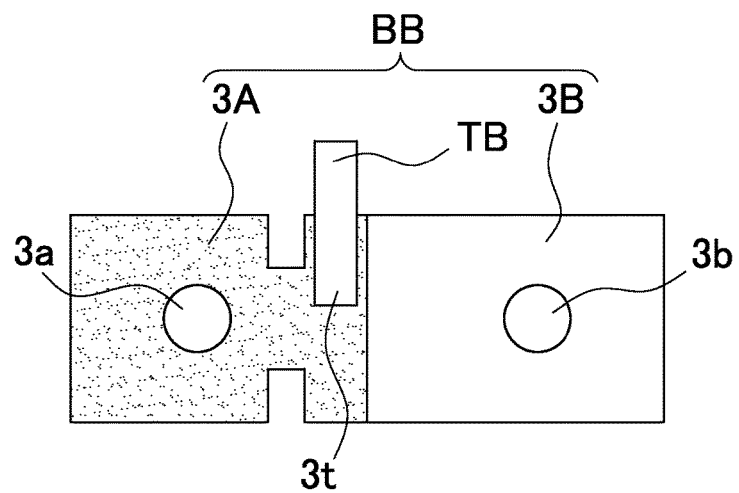
FIG. 14 is a plan view schematically showing a bus bar according to another modified embodiment.
Figure 15:
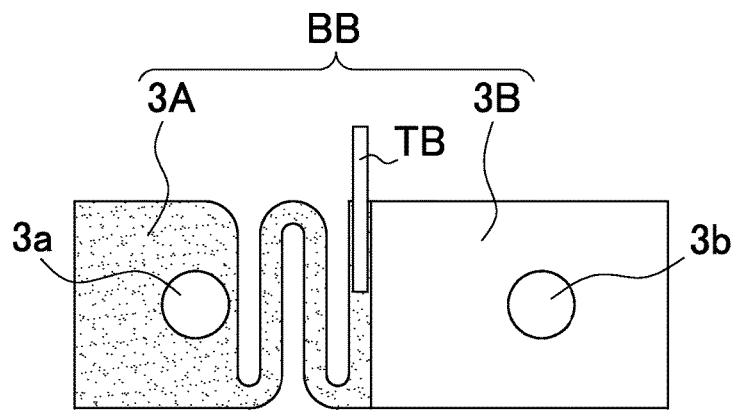
FIG. 15 is a plan view schematically showing a bus bar according to another modified embodiment.

Also, as shown in FIG. 14, slits or recessed parts can be formed between the first terminal holding portion 3a and the tab holding portion 3t in the first metal portion 3A so that the width of the first metal portion is partially reduced. In this case, the impedance of the first metal portion can be also increased. According to this construction, there is an advantage that the depth of the slit or recessed part can be adjusted to allow fine adjustment of the impedance. Also, the bus bar BB may be formed into a serpentine shape as shown in FIG. 15. In this case, the impedance can be also increased.

Figure 16:
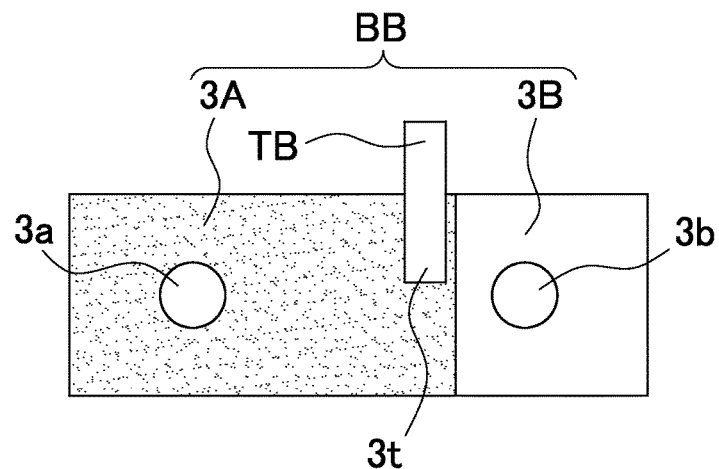
FIG. 16 is a plan view schematically showing a bus bar according to another modified embodiment.

Also, as shown in FIG. 16, the boundary between the first and second metal portions 3A and 3B can be shifted without changing the exterior shape of the bus bar BB so that the position of the tab holding portion 3t can be adjusted. In this case, the impedance can be also adjusted. According to this construction since the bus bar BB can have a conventional shape, fixation, or the like, of the bus bar BB can be performed in a conventional manner. Accordingly, it is possible to avoid reduction in working efficiency. Needless to say, the bus bar can have not only one of the features but also combination of two or more of the features.

(Parallel Connection)

Figure 17:
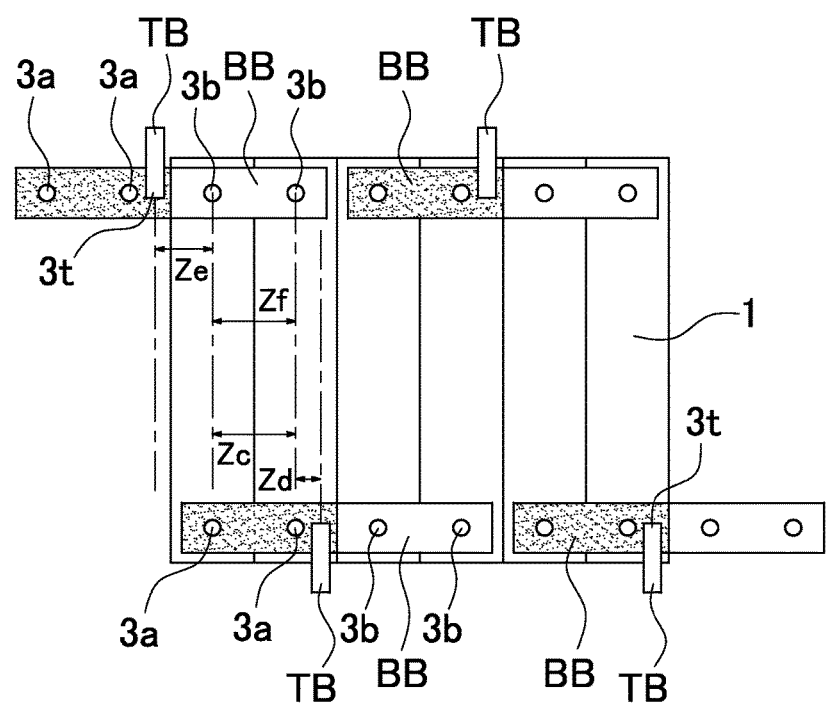
FIG. 17 is a plan view schematically showing a battery assembly that includes bus bars for two-cell-parallel connection.
Figure 18:
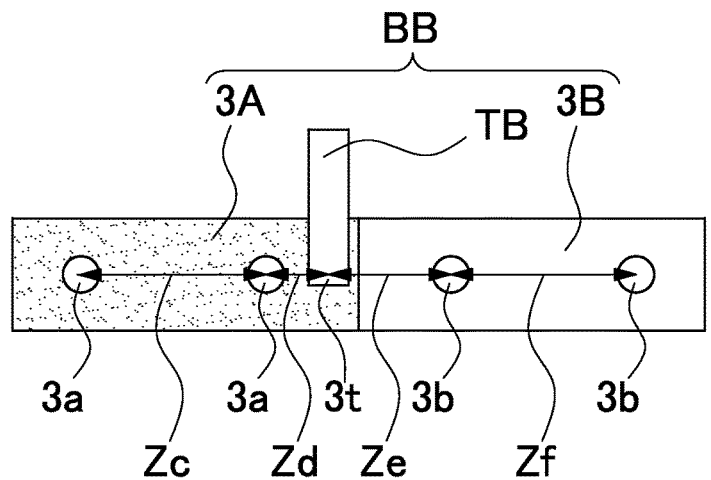
FIG. 18 is a plan view schematically showing a bus bar according to another modified embodiment.
Figure 19:
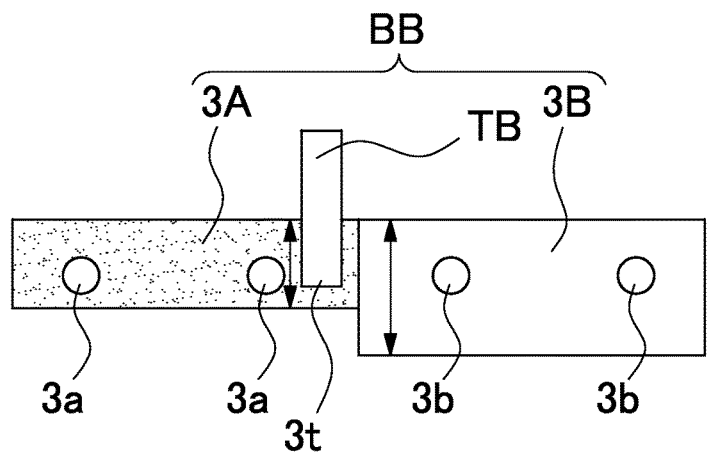
FIG. 19 is a plan view schematically showing a bus bar according to another modified embodiment.
Figure 20:
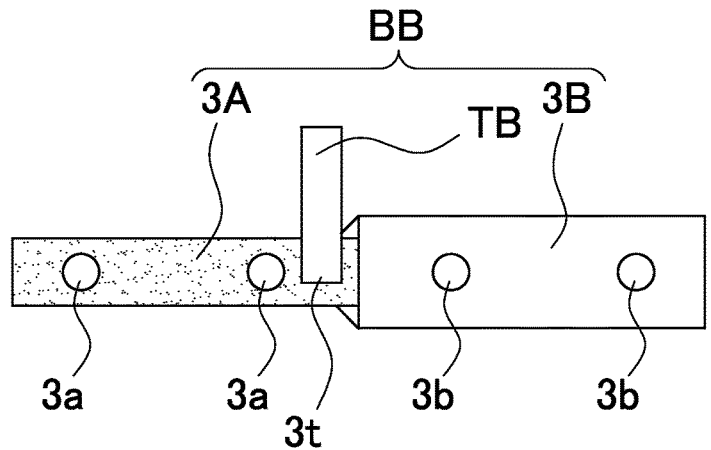
FIG. 20 is a plan view schematically showing a bus bar according to another modified embodiment.
Figure 21:
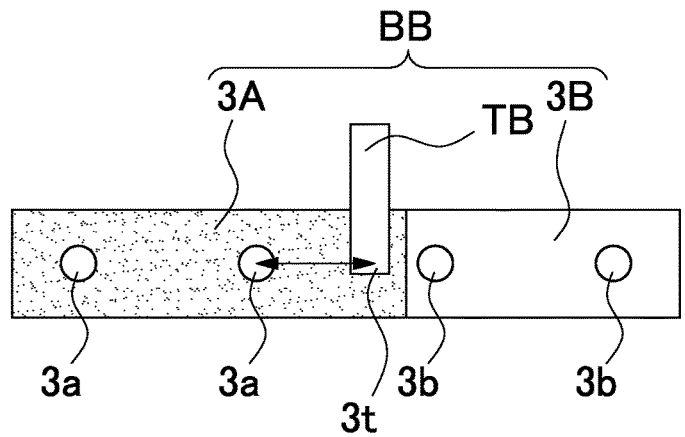
FIG. 21 is a plan view schematically showing a bus bar according to still another modified embodiment.

Although it has been illustratively described that cell voltages are detected with the battery cells being connected in series to each other through the bus bars in the foregoing embodiment, the present invention can be applied to a power supply device that includes the battery cells that are connected in parallel to each other through the bus bars. This type of power supply device is now described with reference to FIG. 17. Three sets of battery cells in the battery assembly are shown in FIG. 17. Two battery cells are connected in parallel to each other in each set. The bus bar BB has two terminal holding portions and a tab holding portion 3t in the first metal portion 3A, and two second terminal holding portions 3b in the second metal portion 3B. In the power supply device of FIG. 17, the impedance between the first terminal holding portions 3a is defined as $Z_c$. Also, the impedance between the first terminal holding portion 3a closer to the tab holding portion 3t and the tab holding portion 3t is defined as $Z_d$. Also, the impedance between the second terminal holding portions 3b is defined as $Z_f$. Also, the impedance between the second terminal holding portion 3b closer to the tab holding portion 3t and the tab holding portion 3t is defined as $Z_e$. In this embodiment, when the synthetic impedances can be adjusted to $Z_c+Z_d=Z_e+Z_f$, correction of cell voltage can be simple. That is, it is preferable that the impedances in the bus bar BB shown in FIG. 18 be adjusted to $Z_d=Z_e$. In addition to this, when the impedances can be adjusted to $Z_c=Z_f$, values of impedances can be reduced from three to two. As a result, correction of cell voltage can be simpler. To achieve this, similar to the foregoing embodiment, for example, as shown in FIG. 19, the width of the first metal portion 3A is dimensioned smaller than the second metal portion 3B, alternatively the width of the second metal portion 3B is dimensioned greater than the first metal portion 3A. Also, in addition to this, the width can be gradually changed as shown in FIG. 20. Also, similar to the foregoing embodiment, the thickness of the first metal portion 3A can be dimensioned smaller than the second metal portion 3B. Also, the width of the first metal portion can be partially reduced. Also, the bus bar may be formed into a serpentine shape. Also, similar to the foregoing embodiment, as shown in FIG. 21, the boundary position of the first metal portion 3A and the second metal portion 3B can be shifted toward the second metal portion 3B, while the tab holding portion 3t can be shifted toward the second metal portion 3B.

According to this construction, although a clad plate of the different metal materials is used as bus bars, it is possible to suppress the variation in battery cell voltage detection through each voltage detection tab TB and to precisely detect battery cell voltages.

Although it has been illustratively described that cell voltages of the battery cells are detected, the present invention is not limited to detection of cell voltages. The present invention can be applied to detection of voltage of a battery assembly that includes a plurality of battery cells, or the like, through the bus bars.

(Five-Parallel-Cell Connection)

Figure 22:
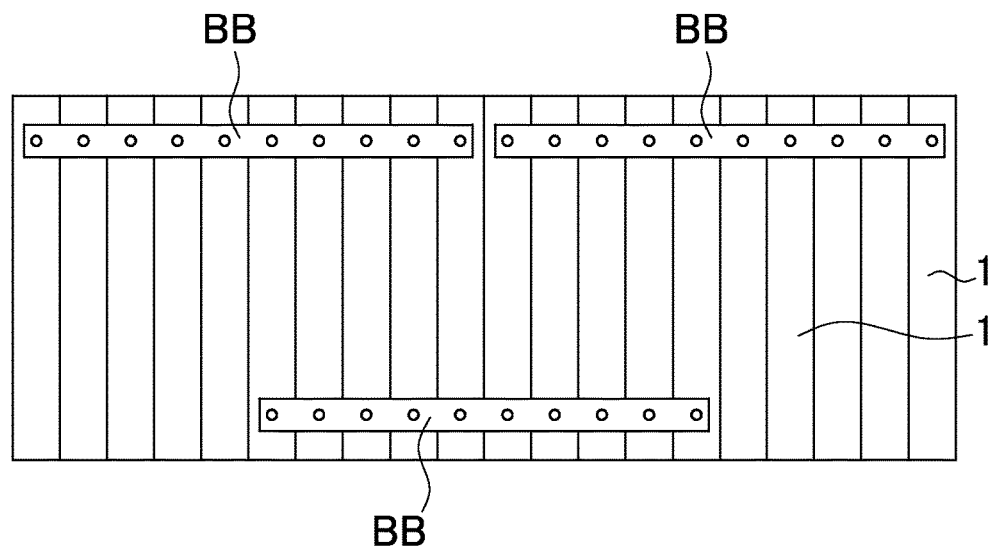
FIG. 22 is a plan view schematically showing a battery assembly that includes bus bars for five-cell-parallel connection.
Figure 23:
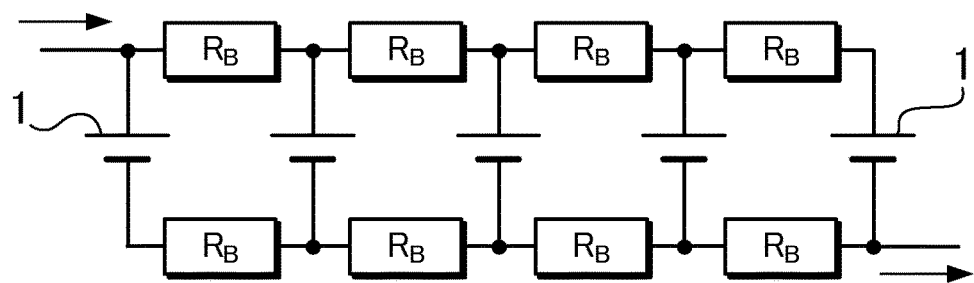
FIG. 23 is a circuit diagram showing the equivalent circuit to FIG. 22.
Figure 24:
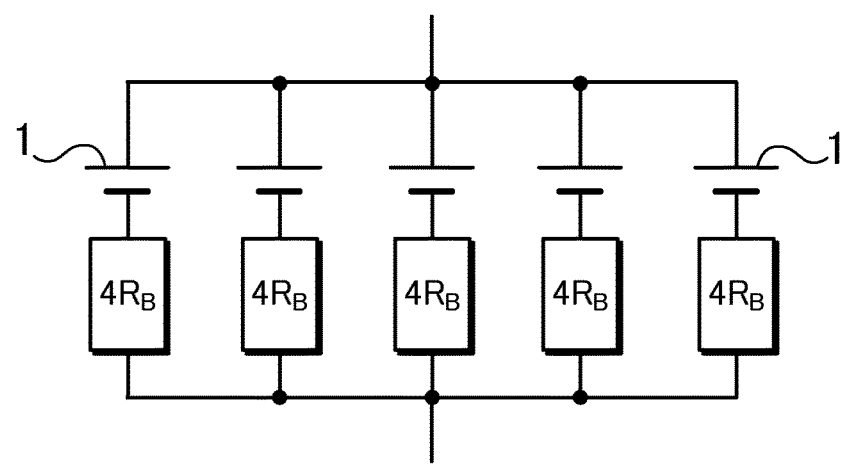
FIG. 24 is a circuit diagram showing the equivalent circuit to FIG. 23.

It has been described that two battery cells are connected in parallel to each other in each set in the foregoing embodiment. However, the number of battery cells that are connected in parallel to each other in each set is not limited to two but can be three or more. For example, five battery cells 1 are connected in parallel to each other in each set as shown in FIG. 22. Here, the resistors of the bus bar BB are defined as $R_B$. FIG. 23 represents a circuit having the tab holding portions to which the voltage detection tabs are secured to measure cell voltages of the five-battery-pack-cell sets. These cell voltages can be detected through the voltage detection tabs. A divided current on each path flows through one battery cell and four resistors $R_B$ of the bus bars BB. Accordingly, the circuit shown in FIG. 23 can be also represented by a circuit shown in FIG. 24. When resistors $4R_B$ have the same electric resistance, actual cell voltages can be approximately calculated based on detected values of cell voltages detected through the cell holding portions.

Although it has been illustratively described that the bus bar is formed of a clad plate in the foregoing embodiment, the bus bar is not limited to a clad plate. The present invention can be also applied to a bus bar that is formed of a single material. That is, as shown in FIG. 5, in the case where the voltage detection tabs TB are arranged at the center in the bus bar BB between the battery pack cells KC, the voltage drops produced by the bus bar BB can be equalized. As a result, it is possible to simply precisely detect battery cell voltages. However, in actual cases, the voltage detection tabs cannot be always positioned at the midpoint between the battery pack cells. Particularly, in the case where a number of battery cells are connected in parallel to each other, the electrode terminals close to and away from the voltage detection tab are included. For this reason, the resistances between the electrode terminals and the voltage detection tab are different from each other. In this case, the bus bar can be suitably used which has the aforementioned shape in order to reduce the difference between the resistances.

(Cooling System Using Refrigerant)

Figure 25:
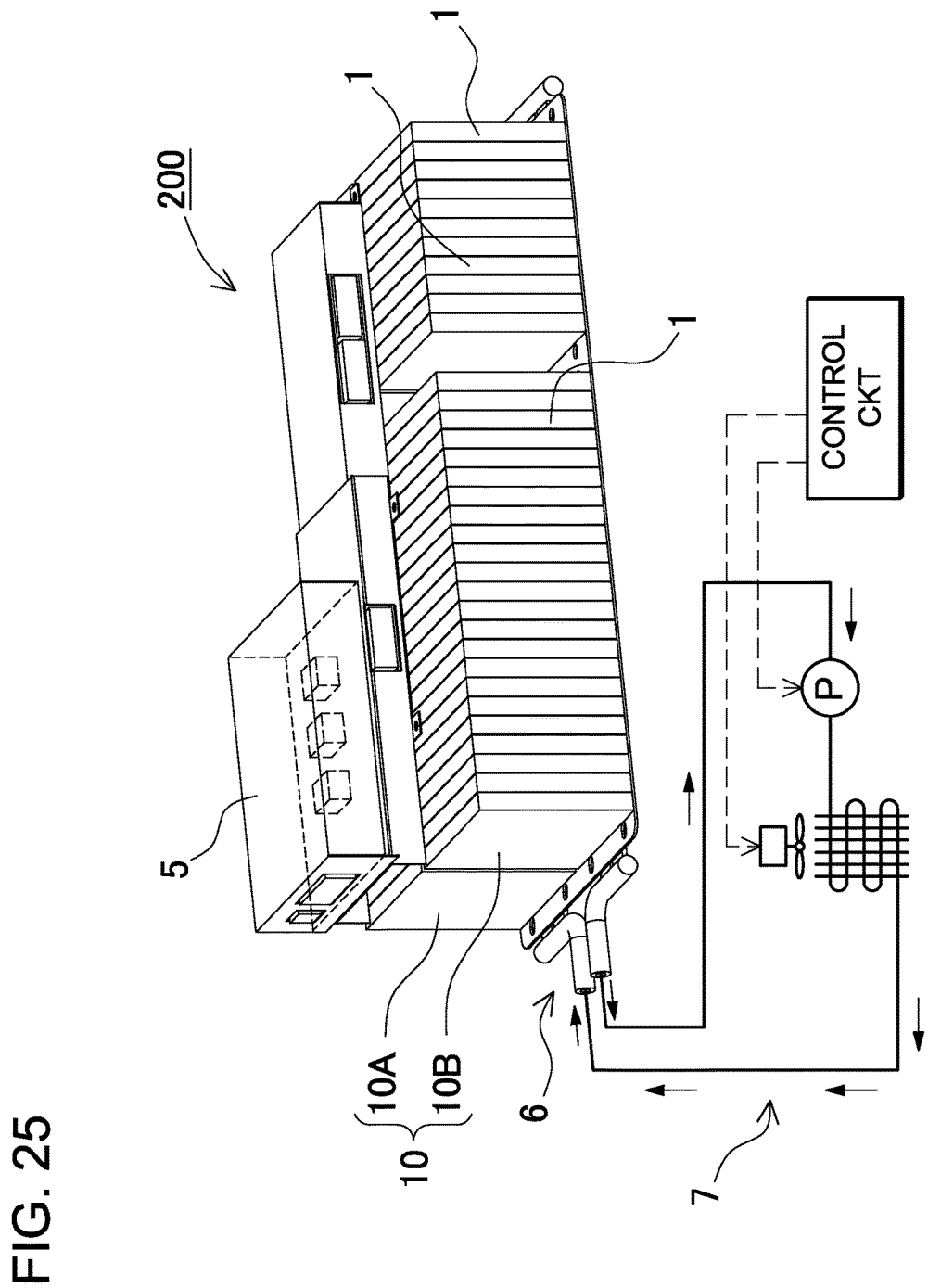
FIG. 25 is a perspective view schematically showing a power supply device that can be cooled by using a refrigerant.

It has been described that the power supply device has an air-cooling system that passes cooling air through gaps between the battery cells whereby cooling the battery cells in the foregoing embodiment. However, the present invention is not limited to this. The power supply device according to the present invention can have a cooling system using a refrigerant. For example, a power supply device 200 shown in FIG. 25 includes a battery assembly 10, a cooling path 6, a cooling mechanism 7, and an electronic component case 5. The battery assembly includes a plurality of battery cells 1 that are arranged side by side. The cooling path is thermally connected to the battery assembly 10, and cools the battery cells 1. The cooling mechanism supplies a cooling medium to the cooling path 6. The electronic component case accommodates electronic circuits that are connected to the battery assembly 10. The cooling medium, which is supplied to the cooling path 6 by the cooling mechanism 7, cools the battery assembly 10. The battery assembly 10 to be cooled by the cooling medium includes an over-cooled side battery 10A, and a warmed side battery 10B. The over-cooled side battery is thermally connected to the inlet half side of the cooling path 6. The warmed side battery is thermally connected to the outlet half side of the cooling path 6. In the battery pack, the electronic component case 5 is thermally connected to the battery assembly 10. In addition, the electronic component case 5 is arranged on the over-cooled side battery 10A relative to the warmed side battery 10B.

The aforementioned power supply device can be used as a power source for vehicles. The power supply device can be installed on electric vehicles such as hybrid cars that are driven by both an internal-combustion engine and an electric motor, and electric vehicles that are driven only by an electric motor. The power supply device can be used as a power supply device for these types of vehicles.

(Hybrid Car Power Supply Device)

Figure 26:
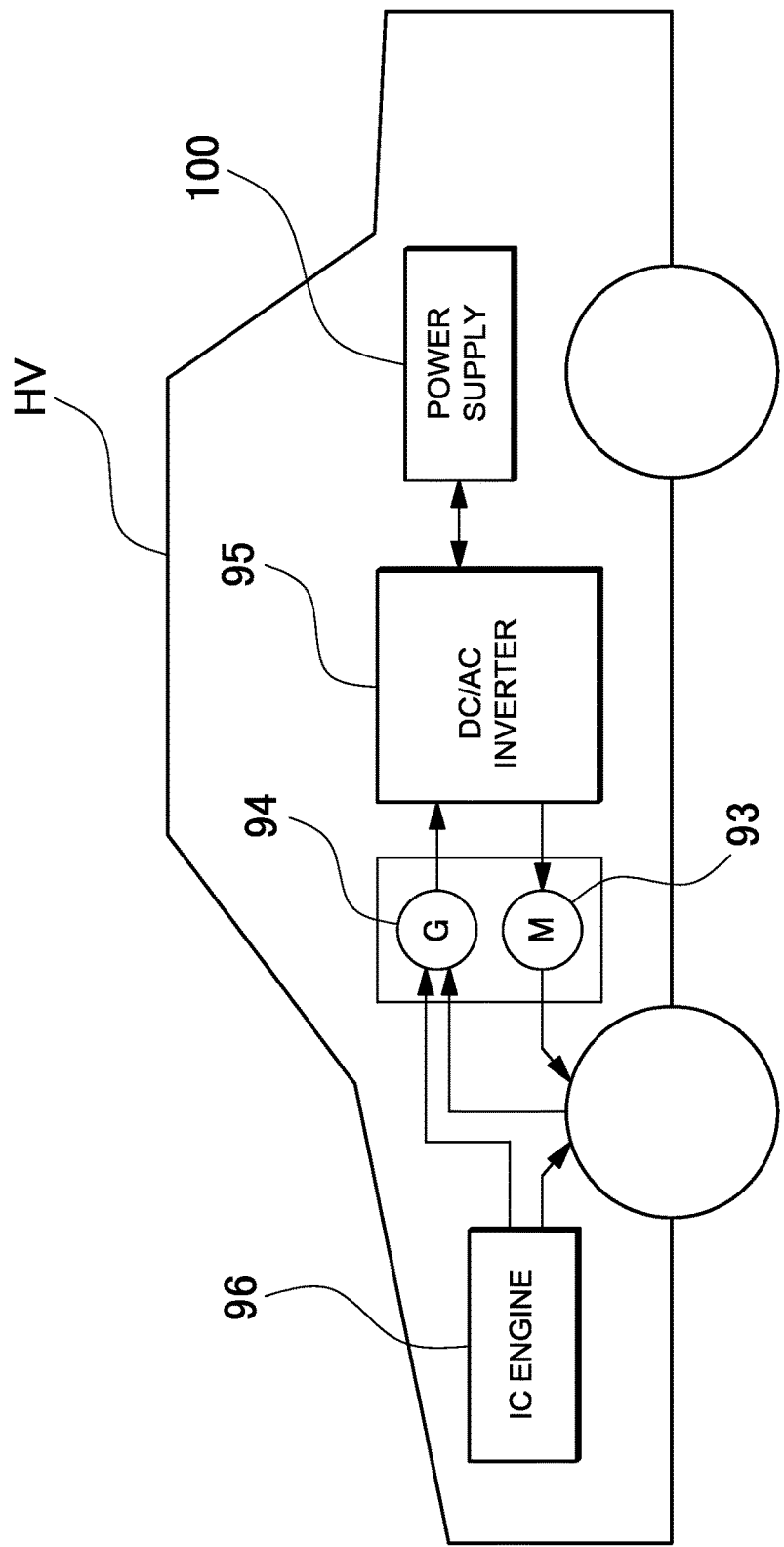
FIG. 26 is a block diagram showing an exemplary hybrid car that is driven by an internal-combustion engine and an electric motor, and includes a power supply device.

FIG. 26 is a block diagram showing an exemplary hybrid car that is driven both by an engine and an electric motor, and includes the power supply device. The illustrated vehicle HV with the power supply device includes an electric motor 93 and an internal-combustion engine 96 that drive the vehicle HV, a power supply device 100 that supplies electric power to the electric motor 93, and an electric generator 94 that charges batteries of the power supply device 100. The power supply device 100 is connected to the electric motor 93 and the electric generator 94 via a DC/AC inverter 95. The vehicle HV is driven both by the electric motor 93 and the internal-combustion engine 96 with the batteries of the power supply device 100 being charged/discharged. The electric motor 93 is energized with electric power and drives the vehicle in a poor engine efficiency range, e.g., in acceleration or in a low speed range. The electric motor 93 is energized by electric power that is supplied from the power supply device 100. The electric generator 94 is driven by the engine 96 or by regenerative braking during vehicle braking so that the batteries of the power supply device 100 are charged.

(Electric Vehicle Power Supply Device)

Figure 27:
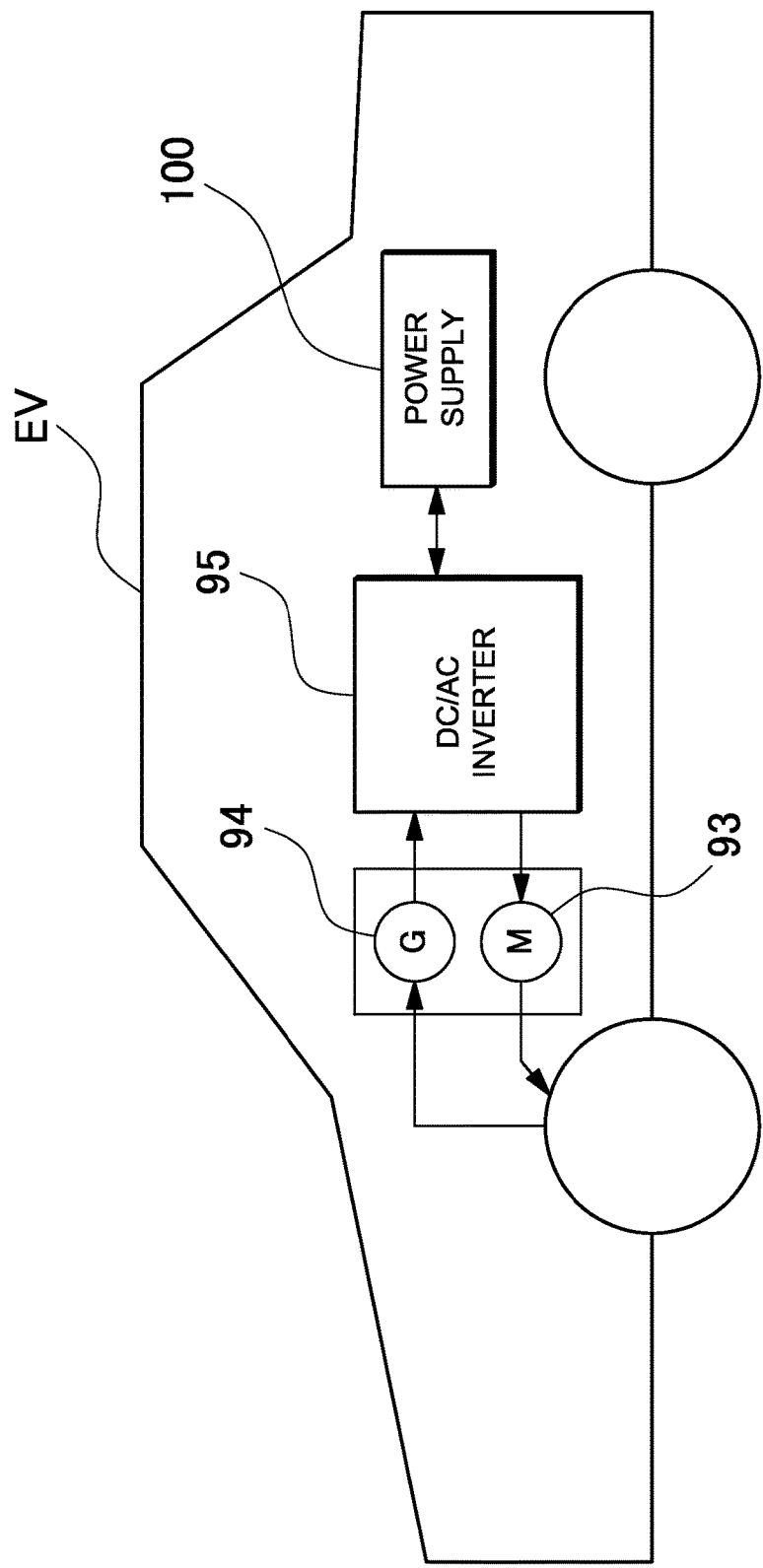
FIG. 27 is a block diagram showing an exemplary electric car that is driven only by an electric motor, and includes a power supply device.

FIG. 27 shows an exemplary electric vehicle that is driven only by an electric motor, and includes the power supply device. The illustrated vehicle EV with the power supply device includes the electric motor 93, which drives the vehicle EV, the power supply device 100, which supplies electric power to the electric motor 93, and the electric generator 94, which charges batteries of the power supply device 100. The electric motor 93 is energized by electric power that is supplied from the power supply device 100. The electric generator 94 can be driven by vehicle EV regenerative braking so that the batteries of the power supply device 100 are charged.

(Power Storage Type Power Supply Device)

Figure 28:
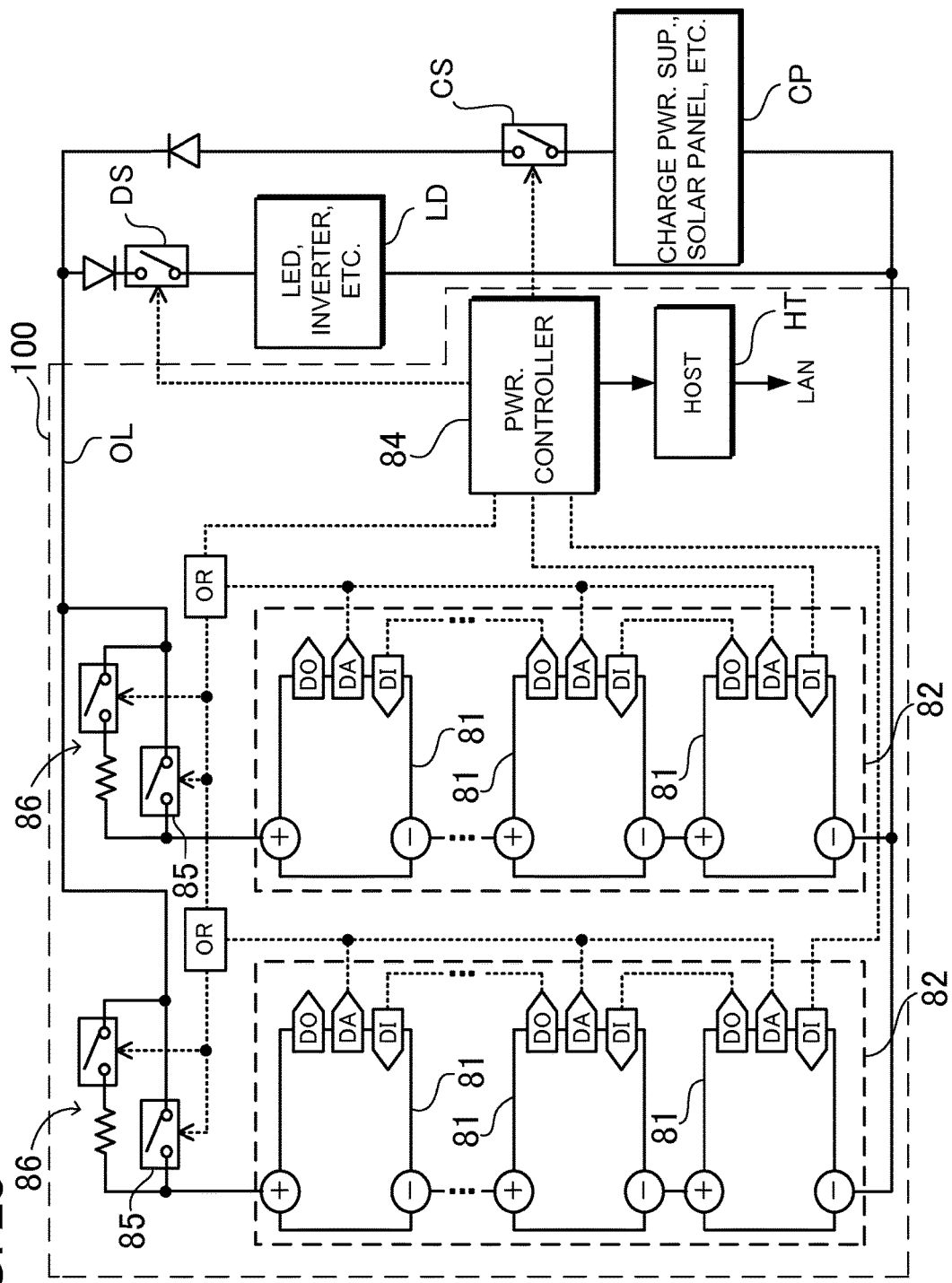
FIG. 28 is a block diagram a power storage type power supply device to which the present invention is applied.
Figure 29:
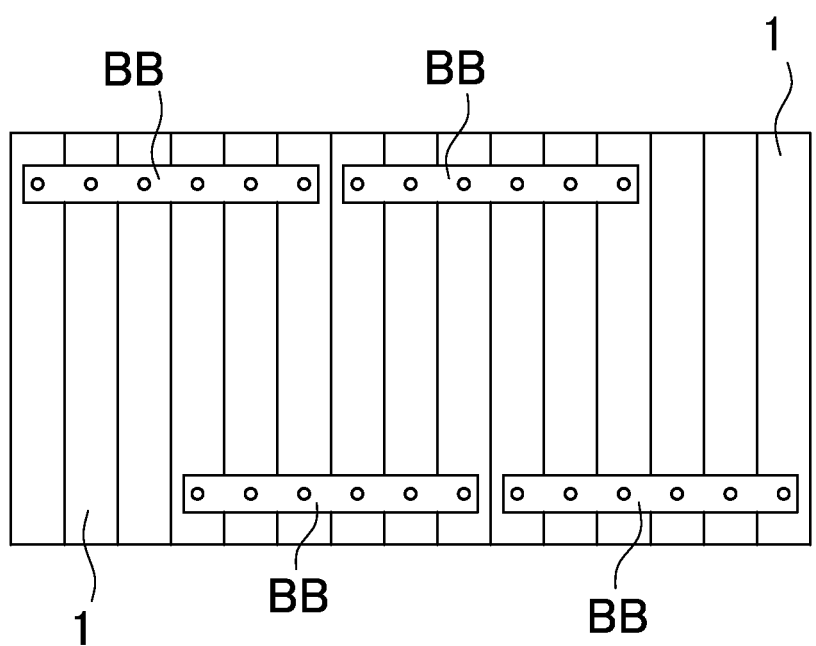
FIG. 29 is a plan view schematically showing the battery assembly, which includes battery cells that are connected to each other in three-cell-parallel and five-cell-serial connection.
Figure 30:
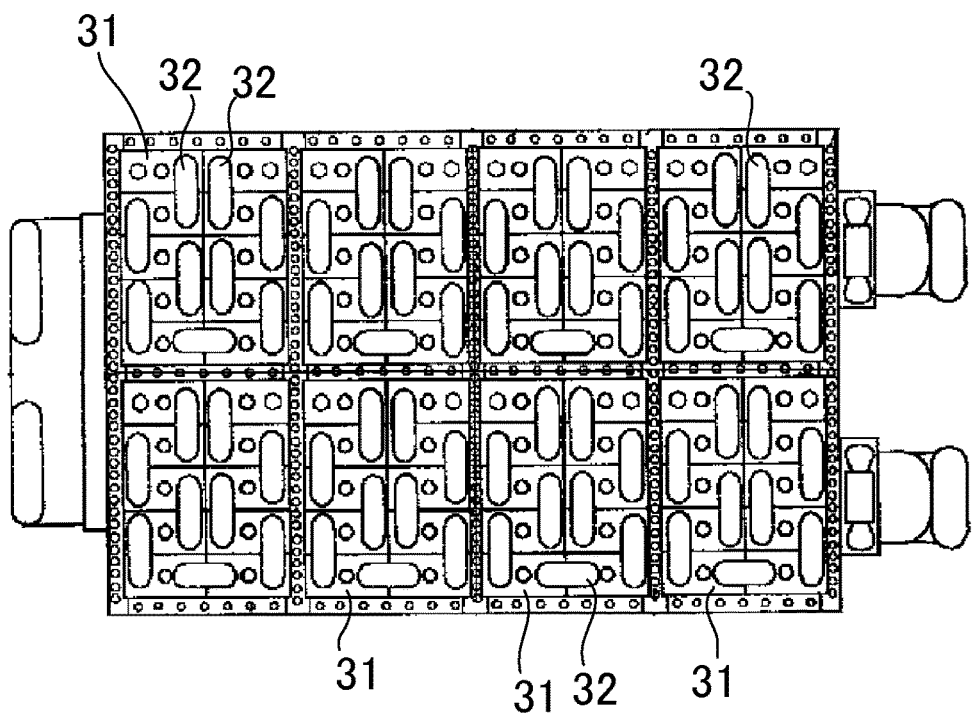
FIG. 30 is a plan view schematically showing a conventional battery module.
Figure 31:
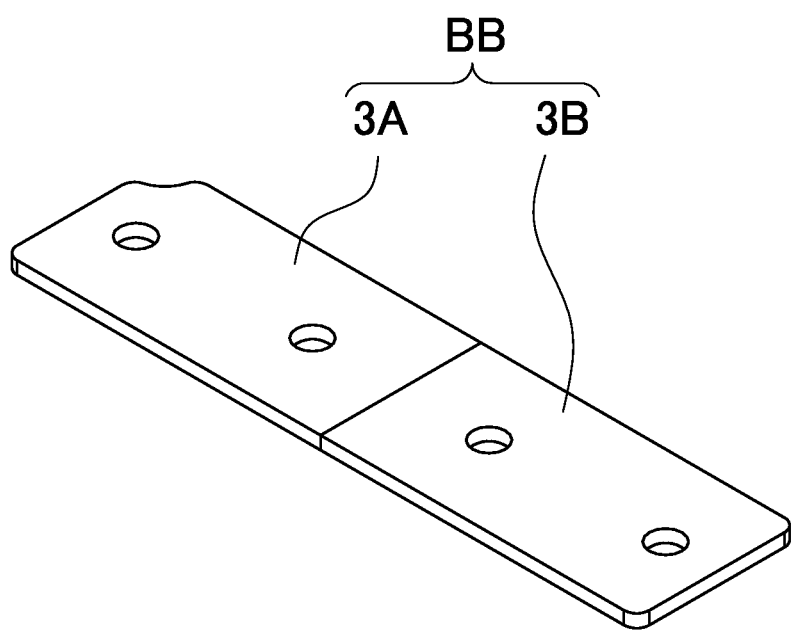
FIG. 31 is a perspective view schematically showing a bus bar that is formed of a clad plate.

The power supply device can be used not only as power supply of mobile unit but also as stationary power storage. For example, examples of stationary power storage devices can be provided by an electric power system for home use or plant use that is charged with sunlight or with midnight electric power and is discharged when necessary, a power supply for street lights that is charged with sunlight during the daytime and is discharged during the nighttime, or a backup power supply for signal lights that drives signal lights in the event of a power failure. FIG. 28 shows this type of electrode structure. This illustrated power supply device 100 includes battery units 82 each of which includes a plurality of battery packs 81 that are connected to each other. In each of battery packs 81, a plurality of battery cells are connected to each other in serial and/or in parallel. The battery packs 81 are controlled by a power supply controller 84. In this power supply device 100, after the battery units 82 are charged by a charging power supply CP, the power supply device 100 drives a load LD. The power supply device 100 has a charging mode and a discharging mode. The Load LD and the charging power supply CP are connected to the power supply device 100 through a discharging switch DS and a charging switch CS, respectively. The discharging switch DS and the charging operation switch CS are turned ON/OFF by the power supply controller 84 of the power supply device 100. In the charging mode, the power supply controller 84 turns the charging operation switch CS ON, and turns the discharging switch DS OFF so that the power supply device 100 can be charged by the charging power supply CP. When the charging operation is completed so that the battery units are fully charged or when the battery units are charged to a capacity not lower than a predetermined value, if the load LD requests electric power, the power supply controller 84 turns the charging operation switch CS OFF, and turns the discharging switch DS ON. Thus, operation is switched from the charging mode to the discharging mode so that the power supply device 100 can be discharged to supply power to the load LD. In addition, if necessary, the charging operation switch CS may be turned ON, while the discharging switch DS may be turned ON so that the load LD can be supplied with electric power while the power supply device 100 can be charged.

When driven by the power supply device 100, the load LD is connected to the power supply device 100 through the discharging switch DS. In the discharging mode of the power supply device 100, the power supply controller 84 turns the discharging switch DS ON so that the power supply device 100 is connected to the load LD. Thus, the load LD is driven with electric power from the power supply device 100. Switching elements such as FET can be used as the discharging switch DS. The discharging switch DS is turned ON/OFF by the power supply controller 84 of the power supply device 100. The power supply controller 84 includes a communication interface for communicating with an external device. In the exemplary power supply device shown in FIG. 28, the power supply controller is connected to a host device HT based on existing communications protocols such as UART and RS-232C. Also, the power supply device may include a user interface that allows users to operate the electric power system if necessary.

Each of the battery packs 81 includes signal terminals and power supply terminals. The signal terminals include a pack input/output terminal DI, a pack abnormality output terminal DA, and a pack connection terminal DO. The pack input/output terminal DI serves as a terminal for providing/receiving signals to/from other battery packs and the power supply controller 84. The pack connection terminal DO serves as a terminal for providing/receiving signals to/from other battery packs as slave packs. The pack abnormality output terminal DA serves as a terminal for providing an abnormality signal of the battery pack to the outside. Also, the power supply terminal is a terminal for connecting one of the battery packs 81 to another battery pack in series or in parallel.

In addition, this power supply device 100 has an equalizing mode for equalizing of the states of the battery units 82. The battery units 82 are connected to an output line OL through parallel connection switches 85, and are connected in parallel to each other. For this reason, the power supply device includes equalizing circuits 86 that are controlled by the power supply controller 84. The equalization circuits 86 suppress variation of the battery remaining capacities among the battery units 82.

A power supply device according to the present invention can be suitably used as power supply devices of plug-in hybrid vehicles and hybrid electric vehicles that can switch between the EV drive mode and the HEV drive mode, electric vehicles, and the like. A vehicle including this power supply device according to the present invention can be suitably used as plug-in hybrid vehicles, hybrid electric vehicles, electric vehicles, and the like. Also, a power supply device according to the present invention can be suitably used as backup power supply devices that can be installed on a rack of a computer server, backup power supply devices for wireless communication base stations, electric power storages for home use or plant use, electric power storage devices such as electric power storages for street lights connected to solar cells, backup power supplies for signal lights, and the like.

The invention claimed is:

1. A power supply device comprising:
a battery assembly that includes a plurality of battery cells including electrode terminals, the plurality of battery cells being arranged side by side;
bus bars that extend in one direction and connect the electrode terminals of the battery cells adjacent to each other;
voltage detection lines that are electrically connectable to the bus bars; and
a plurality of voltage detection tabs that electrically connect the bus bars to the voltage detection lines,
wherein each bus bar is formed of a clad plate that is formed of a first metal portion and a second metal portion having a material that is different from the first metal portion,
wherein each bus bar includes
a first terminal holding portion that is arranged in the first metal portion, and has a holding position for holding the electrode terminal,
a second terminal holding portion that is arranged in the second metal portion, and has a holding position for holding the electrode terminal, and
a tab holding portion that is arranged in the first metal portion, and has a holding position for holding the voltage detection tab, and
wherein the electrical conductivity of the first metal portion is higher than the second metal portion,
the distance between the first terminal holding portion and the tab holding portion is greater than the distance between the tab holding portion and the second terminal holding portion,
the bus bar is formed such that a width of the bus bar is partially reduced in a region between the first terminal holding portion and the tab holding portion,
the tab holding portion is arranged between the electrode terminals, and
the impedance between the first terminal holding portion and the tab holding portion is substantially equal to the impedance between the tab holding portion and the second terminal holding portion.

2. The power supply device according to claim 1, wherein the first metal portion is thinner than the second metal portion.

3. The power supply device according to claim 1, wherein the first metal portion has a narrower part that has a width smaller than other part of the first metal portion, and is arranged between the first terminal holding portion and the tab holding portion.

4. The power supply device according to claim 1, wherein the second metal portion is wider than the first metal portion.

5. The power supply device according to claim 1, wherein two or more first terminal holding portions are provided as the first terminal holding portion of the first metal portion, and two or more second terminal holding portions are provided as the second terminal holding portion of the second metal portion, and
the impedance between the first terminal holding portions in the first metal portion is substantially equal to the impedance between the second terminal holding portions in the second metal portion.

6. The power supply device according to claim 5, wherein the impedance between the tab holding portion and one of the two or more first terminal holding portions that is located closest to the second metal portion is substantially equal to the impedance between the tab holding portion and one of the two or more second terminal holding portions that is located closest to the first metal portion.

7. The power supply device according to claim 1, wherein the first metal portion of the bus bar is formed of the same material as the voltage detection tab.

8. The power supply device according to claim 7, wherein the first and second metal portions of the bus bar are formed of copper and aluminum, respectively, and
the voltage detection tab is formed of copper.

9. A power supply device comprising:
a battery assembly that includes a plurality of battery cells including electrode terminals, the plurality of battery cells being arranged side by side;
bus bars that are formed of a single material and extend in one direction and connect the electrode terminals of the battery cells adjacent to each other;

voltage detection lines that are electrically connectable to the bus bars; and a plurality of voltage detection tabs that electrically connect the bus bars to the voltage detection lines, wherein each bus bar includes a first terminal holding portion that has a holding position for holding the electrode terminal of one of the battery cells adjacent to each other, a second terminal holding portion that has a holding position for holding the electrode terminal of another of the battery cells adjacent to each other, and a tab holding portion that is arranged between the first and second holding positions, and has a holding position for holding the voltage detection tab, and wherein the distance between the first terminal holding portion and the tab holding portion is greater than the distance between the tab holding portion and the second terminal holding portion, the bus bar is formed such that a width of the bus bar is partially reduced in a region between the first terminal holding portion and the tab holding portion, the tab holding portion is arranged between the electrode terminals, and the impedance between the first terminal holding portion and the tab holding portion is substantially equal to the impedance between the tab holding portion and the second terminal holding portion.

10. The power supply device according to claim 1, wherein the voltage detection tab is joined to the bus bar by laser welding.

11. The power supply device according to claim 1, wherein the voltage detection tab is joined to a flexible base by reflowing.

12. The power supply device according to claim 1, wherein the voltage detection lines are arranged on flexible bases each of which holds a plurality of detection lines that are electrically connected to the bus bars, and extends in one direction.

13. The power supply device according to claim 12, wherein the bus bar extends substantially in parallel to the side-by-side arrangement direction of the battery cells, the flexible base extends substantially in parallel to the bus bar, and the voltage detection tab straddle the space between the bus bar and the flexible base.

14. The power supply device according to claim 1, wherein the battery cell is a rectangular battery cell that has a rectangular exterior shape.

15. A vehicle comprising the power supply device according to claim 1.

* * * * *